US008749385B2

(12) United States Patent
Bernhard et al.

(10) Patent No.: US 8,749,385 B2
(45) Date of Patent: Jun. 10, 2014

(54) SYSTEM AND METHOD FOR DETECTING WHETHER AN OBJECT OR PERSON CROSSES A LIMIT MARKED BY A MAGNETIC FIELD

(75) Inventors: Josef Bernhard, Nabburg (DE); Thomas Leipold, Erlangen (DE); Thomas von der Gruen, Kleinsendelbach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1016 days.

(21) Appl. No.: 12/738,274

(22) PCT Filed: Oct. 15, 2008

(86) PCT No.: PCT/EP2008/008994
§ 371 (c)(1),
(2), (4) Date: Aug. 12, 2010

(87) PCT Pub. No.: WO2009/049919
PCT Pub. Date: Apr. 23, 2009

(65) Prior Publication Data
US 2010/0321185 A1 Dec. 23, 2010

(30) Foreign Application Priority Data

Oct. 15, 2007 (DE) .......................... 10 2007 049 497
Nov. 7, 2007 (DE) .......................... 10 2007 052 946

(51) Int. Cl.
*G08B 13/24* (2006.01)
*A63C 19/06* (2006.01)

(52) U.S. Cl.
USPC ........ 340/551; 340/540; 340/426.1; 340/571; 340/568.5; 473/570; 473/467; 473/480; 324/260

(58) Field of Classification Search
None
See application file for complete search history.

(56) References Cited

U.S. PATENT DOCUMENTS

| | | | | |
|---|---|---|---|---|
| 3,768,586 A | * | 10/1973 | Thompson et al. | 180/168 |
| 3,857,089 A | * | 12/1974 | Adler et al. | 324/207.17 |
| 4,014,117 A | | 3/1977 | Vallillee | |
| 4,375,289 A | * | 3/1983 | Schmall et al. | 273/371 |
| 4,577,880 A | * | 3/1986 | Bianco | 280/33.994 |
| 4,591,175 A | * | 5/1986 | Upton et al. | 280/33.994 |

(Continued)

FOREIGN PATENT DOCUMENTS

| | | |
|---|---|---|
| DE | 20 51 386 A1 | 4/1972 |
| GB | 2 001 250 A | 1/1979 |
| WO | WO 99/03720 A1 | 1/1999 |

*Primary Examiner* — Brian Zimmerman
*Assistant Examiner* — Kevin Lau
(74) *Attorney, Agent, or Firm* — Faegre Baker Daniels LLP

(57) ABSTRACT

A device for recognizing when an object or a person crosses a threshold that is marked by a magnetic field comprises a first magnetic field sensor that is designed to detect a first magnetic field component of the magnetic alternating field and to deliver an associated magnetic field sensor signal. The device comprises a second magnetic field sensor that is designed to detect a second magnetic field component of the alternating magnetic field. The device also comprises an evaluator that is designed to deliver information in response to a change in a phase relationship between the magnetic field sensor signal delivered by the first magnetic field sensor and a reference signal based on the detection of the second magnetic field component by the second magnetic field sensor, said information indicating that the object or person has crossed the marked threshold.

20 Claims, 15 Drawing Sheets

(56) References Cited

U.S. PATENT DOCUMENTS

| | | | |
|---|---|---|---|
| 4,720,701 A * | 1/1988 | Lichtblau | 340/572.4 |
| 5,194,844 A * | 3/1993 | Zelda | 340/426.11 |
| 5,315,290 A | 5/1994 | Moreno | |
| 5,357,182 A | 10/1994 | Wolfe | |
| 5,806,862 A * | 9/1998 | Merryman et al. | 280/33.994 |
| 6,037,869 A | 3/2000 | Lace | |
| 6,054,923 A * | 4/2000 | Prather et al. | 340/568.5 |
| 6,125,972 A | 10/2000 | French | |
| 6,127,927 A * | 10/2000 | Durban et al. | 340/568.5 |
| 6,158,392 A * | 12/2000 | Andre et al. | 119/721 |
| 6,161,849 A | 12/2000 | Schweninger | |
| 6,353,388 B1 | 3/2002 | Durban | |
| 6,362,728 B1 | 3/2002 | Lace | |
| 6,417,771 B1 * | 7/2002 | Tyren | 340/572.2 |
| 6,418,385 B1 * | 7/2002 | Hucker et al. | 702/64 |
| 6,945,366 B2 | 9/2005 | Taba | |
| 2001/0009367 A1 * | 7/2001 | Seitzer et al. | 324/207.21 |
| 2001/0030610 A1 * | 10/2001 | Rochelle et al. | 340/686.6 |
| 2004/0257294 A1 * | 12/2004 | Bernard et al. | 343/866 |
| 2005/0258820 A1 * | 11/2005 | Forster | 324/165 |
| 2006/0136169 A1 * | 6/2006 | Shonai et al. | 702/145 |
| 2006/0226994 A1 * | 10/2006 | So | 340/573.3 |
| 2006/0244588 A1 * | 11/2006 | Hannah et al. | 340/539.13 |
| 2006/0247847 A1 * | 11/2006 | Carter et al. | 701/200 |
| 2007/0299625 A1 * | 12/2007 | Englert et al. | 702/150 |
| 2008/0074260 A1 * | 3/2008 | Reiner | 340/568.5 |
| 2008/0252015 A1 * | 10/2008 | Eskildsen | 273/371 |
| 2008/0314667 A1 * | 12/2008 | Hannah et al. | 180/197 |
| 2009/0102460 A1 * | 4/2009 | Schott et al. | 324/207.2 |
| 2009/0108835 A1 * | 4/2009 | Englert et al. | 324/207.16 |
| 2009/0128139 A1 * | 5/2009 | Drenth et al. | 324/207.22 |
| 2010/0052667 A1 * | 3/2010 | Kohama et al. | 324/239 |

\* cited by examiner

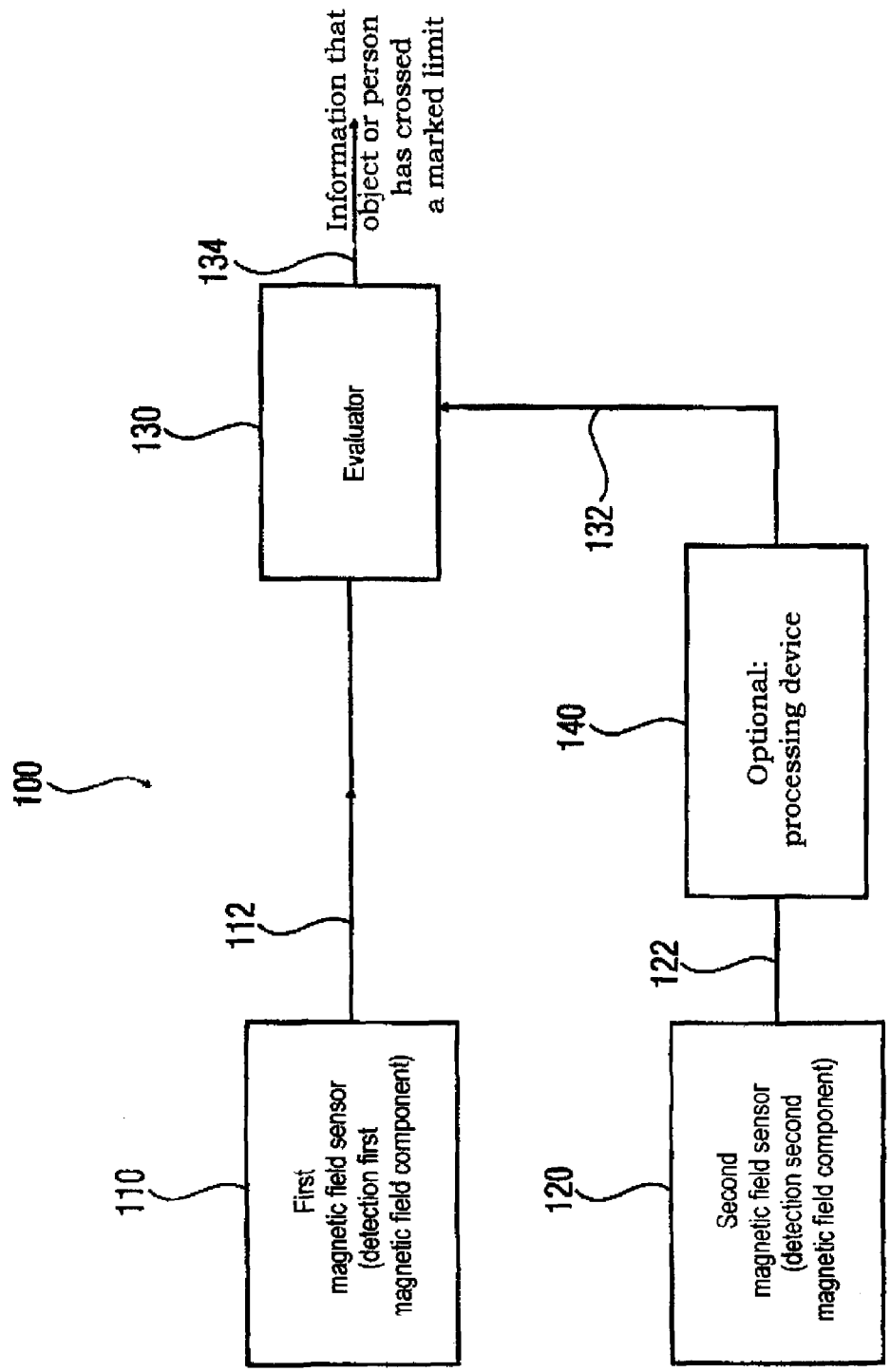

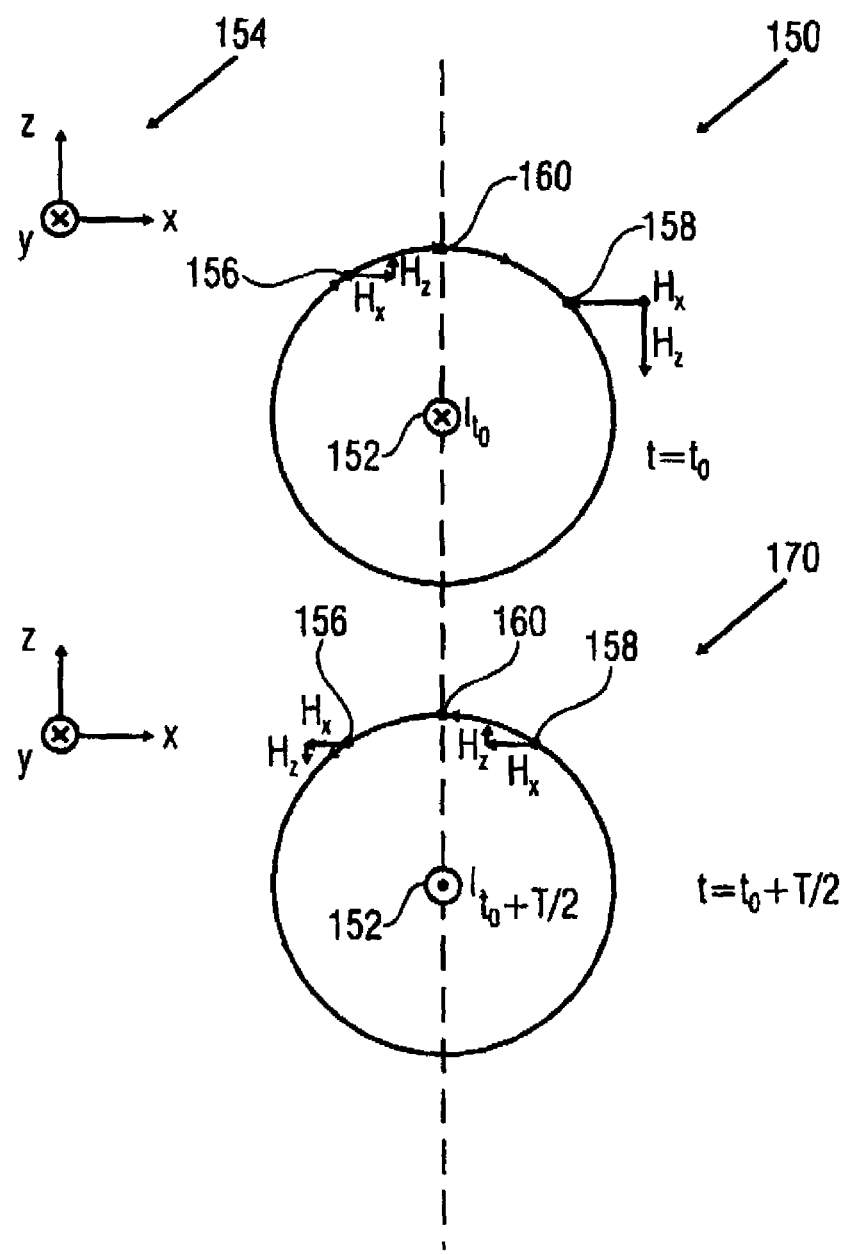

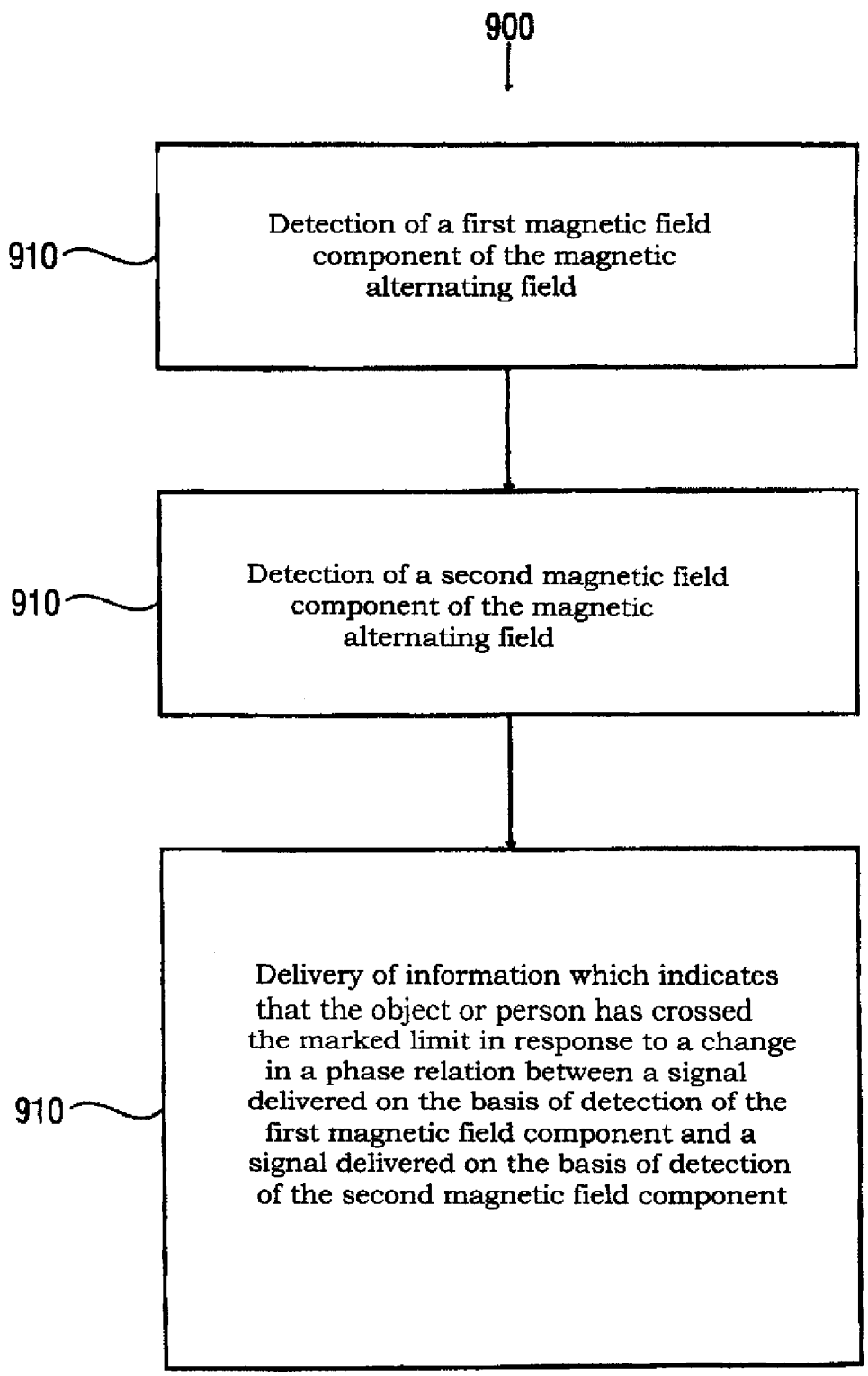

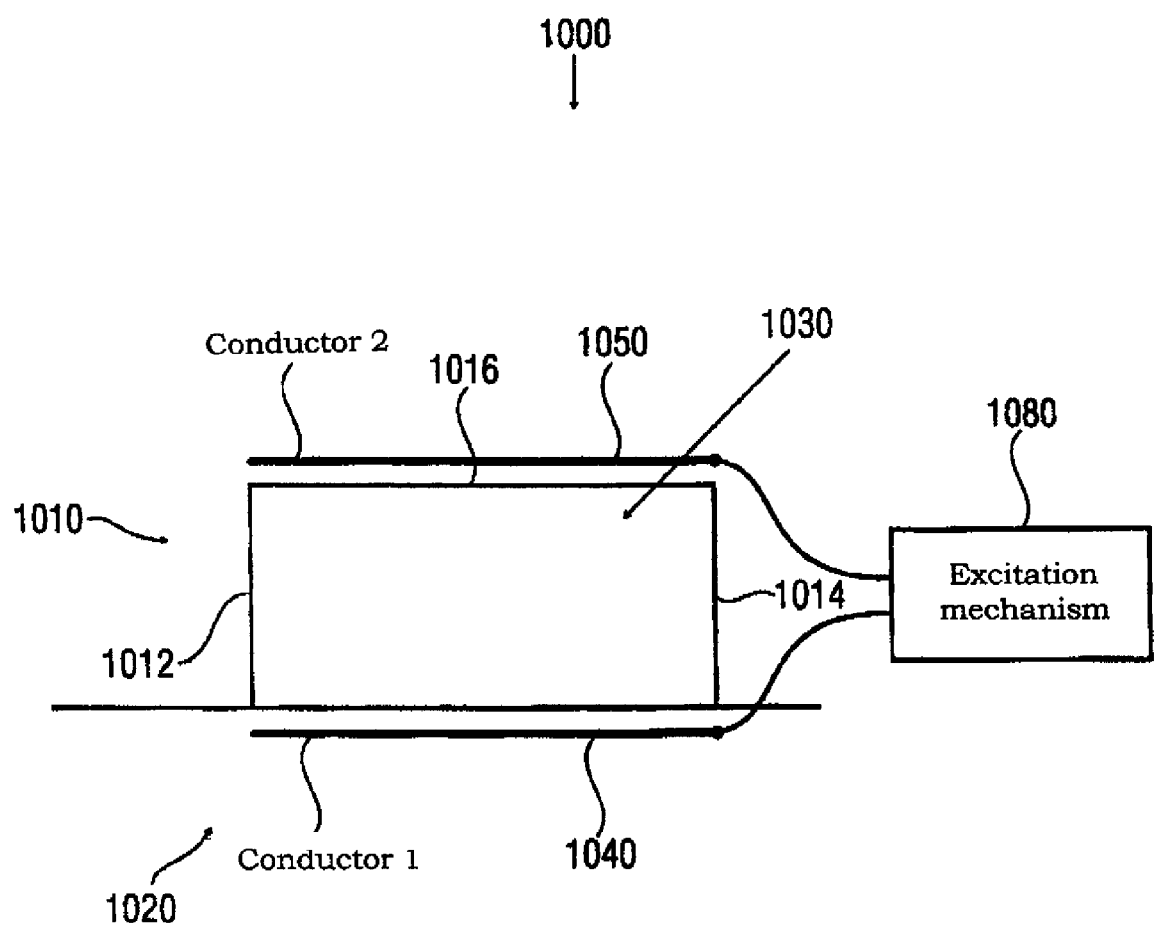

SYSTEM AND METHOD FOR DETECTING WHETHER AN OBJECT OR PERSON CROSSES A LIMIT MARKED BY A MAGNETIC FIELD

CROSS-REFERENCE TO RELATED APPLICATIONS

This application claims priority to PCT Application Ser. No. PCT/EP2008/008994, filed Oct. 15, 2008, which claims priority to DE 10 2007 049 497.3, filed Oct. 15, 2007, and DE 10 2007 052 946.7, filed Nov. 7, 2007, each of which is herein incorporated by reference in its entirety.

FIELD OF THE INVENTION

The present invention relates in general to a device, a method, a computer program and a system for detecting if a person crosses a limit marked by a magnetic field.

A few embodiments relate also to a method for monitoring an area and for monitoring objects which leave the area.

BACKGROUND

Many different applications exist in which it is desired to monitor whether an object or a person enters a specific region or leaves the specific region. Thus for example entry of an object or a person into a region or leaving this region can entail an economic or even a safety risk.

In some cases, it appears to be advantageous to mark a limit of a specific region, for example by means of an electrical field or even by a magnetic field. Thus there are systems on the market, for example for monitoring the theft of shopping trolleys in supermarkets, which lock a wheel of the shopping trolley when an area of ground is crossed (e.g. when leaving the car park via an exit) and hence prevent a thief who is trying to steal the shopping trolley from moving further.

Some of these systems comprise a cable which is buried in the ground as an antenna and also a receiver in the wheel (e.g. of the shopping trolley). The cable buried in the ground can be laid for example around the complete area or region to be monitored. Furthermore, the cable buried in the ground is generally connected to a transmitter which produces a modulated (or unmodulated) signal at a specific frequency (e.g. 8 kHz). This signal is emitted by the cable, as a result of which an electromagnetic field is produced around the cable. If for example the shopping trolley approaches the buried line or the buried cable, then the receiver (which is situated for example in the wheel of the shopping trolley) detects the signal (emitted by the cable) from a specific proximity and triggers locking of the wheel. For deactivation of the locking of the wheel, for example a second signal is transmitted either (A) by a second line or (B) by a mobile device. If the receiver receives the second signal, the locking of the wheel can be released again.

If the second signal is emitted by a second line, then it is necessary in many cases to bury a second line in the ground. If the second signal, in contrast, is emitted by a mobile device, then usually an additional operator is required who goes towards the shopping trolley with the device.

In U.S. Pat. No. 5,194,844 a method is described with which activation and deactivation of the locking mechanism can be achieved via only one signal or one buried line. In the case of this method, an asymmetrical (rectangular) signal with a pulse-duty ratio (duty cycle) of less than 40% is transmitted. The signal is received via a receiver coil and evaluated. Because of the asymmetry of the signal, a constant component is produced, on the basis of which a receiver can decide whether it is situated within or outside the monitored region. However, the method requires a special signal shape and therefore cannot be applied in the systems found on the market which use a modulated or unmodulated symmetrical (sine) carrier signal.

A large number of further systems are known furthermore from prior art in order to produce theft protection in shopping trolleys or to enable position determination.

Thus WO 99/03720, U.S. Pat. No. 6,362,728, U.S. Pat. No. 6,945,366, U.S. Pat. No. 6,353,388, U.S. Pat. No. 6,127,927 and U.S. Pat. No. 6,037,869 respectively describe similar theft protection systems for vehicles, such as e.g. shopping trolleys. The system described in the mentioned documents includes a buried cable which defines a predetermined spatial periphery. The system includes furthermore a receiver which is assigned to a wheel of the vehicle. The receiver is designed to receive a predetermined signal and, in response thereto, to move a locking component for locking the wheel from a released state into a locked state or vice versa. A decision as to whether the locking component is displaced into the released or the locked state is effected on the basis of whether the wheel was locked or was freely moveable when approaching the buried cable.

U.S. Pat. No. 5,315,290 describes a mechanism for locking a trolley. The mechanism responds to signals which describe a permissible usage region of the trolley and is contained completely within the wheel of the trolley. The mechanism comprises a printed circuit board with a high frequency receiver, a decoder and a logic driver. The mechanism comprises furthermore a solid body device. If the receiver detects that the trolley has been moved out of the previously described area of use, the solid body device is supplied with energy in order to lock rotation of the wheel and hence to lock the trolley. The mentioned system is based essentially upon detecting a signal strength of a signal emitted by a central antenna. If the receiver loses the signal, then this indicates that the trolley has been moved out of the previously described area of use. If, in contrast, the signal is found again, then this indicates that the trolley is again situated within the previously described area of use.

U.S. Pat. No. 6,125,972 describes a further safety apparatus for a shopping trolley or other vehicles. A braking component is mounted rotatably on an axle of one of the wheels. The braking component is designed to separate the wheel from the ground in an operating position and thus to lock a movement of the vehicle. A locking device locks the braking component in a raised position. The braking component is furthermore released, in response to a signal from a signalling system which extends around a region in which the trolley is intended to be retained. In this case, the braking component rotates into an operating position and thus stops normal movement of the trolley. The system comprises in addition a buried loop antenna which is buried along a periphery of the region to be monitored. A receiver which actuates the braking component comprises a resonator, a high frequency amplifier, a rectifier, a threshold detector and a pulse generator for actuating a solid body. The locking mechanism is deactivated again furthermore by using a special key. For this purpose, a housing has a keyhole.

US 2006/0247847 A1 describes a navigation system which uses a compound navigation method in order to estimate a current position of an object relative to one or more earlier positions. The compound navigation method determines a change in position from the direction and speed of the object during a time interval. The system comprises inter alia also a magnetic field sensor. With the help of two magnetic field sensors, which are disposed for example along an x axis and along a z axis, for example a magnetic direction marker can be detected in addition. Furthermore, for example a marking with a magnetic strip code (bar code) can be evaluated. A two-axis magnetic sensor is designed for example to detect magnetic field components in the direction of movement of the object and perpendicular to the direction of movement of the object. A z-axis sensor can be used for example to detect the beginning and the end of a bit. A y-axis sensor, in contrast, detects whether the bit concerns a "1" or a "0".

US 2006/0244588 A1 describes a bidirectional communication system for tracking positions and states of vehicles. The vehicle tracking system comprises a wheel which contains a sensor circuit. The sensor circuit is able to detect different conditions, such as e.g. rotation of the wheel, a vibration of the wheel or specific electromagnetic and/or magnetic signals which indicate a specific position of the wheel. The mentioned document describes inter alia the use of magnetic markings or strips in order to produce an additional position tracking mechanism. Each magnetic strip has an unequivocal magnetic pattern which can be detected by a magnetic field sensor which is contained in each wheel. Furthermore, the system includes a signal line for a signal with a very low frequency. A code which is transmitted via this line can correspond unequivocally to the entrance or exit of a shop. Entry of the trolley into the shop can be distinguished from leaving the shop in that a timing, with which the transceiver-receiver of the trolley receives the signal with the very low frequency, is evaluated relative to a timing with which the trolley sees different RSSI levels from access points mounted at the exits.

U.S. Pat. No. 6,161,849 describes a steering wheel locking device for use with shopping trolleys which have at least one articulated wheel. The locking device locks the rotatable wheel in a rotated configuration so that the trolley can move merely along a circular path. Resetting of the locking device can be effected for example by using a portable transmitter. As an alternative thereto, also a mechanical key can be used to reset the locking.

U.S. Pat. No. 5,357,182 describes a further theft prevention system for shopping trolleys. The system aims to brake a vehicle if an attempt is made to move the vehicle out of a defined periphery. At least one wheel of the vehicle is coupled mechanically to an axle which carries a device in order to produce an electrical current in response to a rotation of the axle. The system comprises furthermore a circuit which is designed to short circuit the terminals in response to a predetermined signal in order hence to prevent rotation of the axle and to brake the wheel. The system includes furthermore a device for producing the predetermined signal and a device for local emission of a signal along the periphery. In the mentioned system, two antennae which emit different signals are used. A signal which is emitted from the first antenna effects locking of the wheel. A signal which is emitted from the second antenna effects release of the locking of the wheel.

SUMMARY OF THE INVENTION

The present invention produces a device for detecting if an object or a person crosses a limit marked by a magnetic alternating field. The device includes a first magnetic field sensor which is designed to detect a first magnetic field component of the magnetic alternating field and to deliver an associated magnetic field sensor signal. The device includes in addition a second magnetic field sensor which is designed to detect a second magnetic field component of the magnetic alternating field. A magnetic field main sensitivity direction of the first magnetic field sensor differs from a magnetic field main sensitivity direction of the second magnetic field sensor.

The device includes furthermore an evaluator which is designed, in response to a change in a phase relation between the magnetic field sensor signal, delivered by the first magnetic field sensor, and a reference signal which is based on detection of the second magnetic field component by the second magnetic field sensor, to deliver information which indicates that the object or the person has crossed the marked limit.

A few embodiments of the present invention are based on the knowledge that crossing a limit marked by a magnetic alternating field is reflected in a change in the phase relation between different magnetic field components. While in fact, for example within the limit marked by the magnetic alternating field, two different magnetic field components can be in phase relative to each other, the corresponding magnetic field components for example outside the limit marked by the magnetic alternating field are in antiphase. Thus it was recognized in addition that the phase relation between two different magnetic field components in some embodiments is a substantially more reliable measure of whether the limit marked by the magnetic alternating field has been crossed than for example the amplitude of the corresponding magnetic field component.

In addition, by the evaluation of a phase relation between different magnetic field components, it can be established in some cases, even if not in all cases, on which side of the limit marked by the magnetic alternating field the device or the object or the person is precisely located.

In some embodiments, a phase relation between different magnetic field components enables reliable detection of whether the device or an object or a person, who is provided with the an embodiment of the device, has crossed the limit marked by the magnetic alternating field.

A first magnetic field component is thereby evaluated by the first magnetic field sensor, while, in contrast, a second magnetic field component (the orientation of which differs for example from the orientation of the first magnetic field component) can be evaluated for example by the second magnetic field sensor in order to obtain a reference signal for evaluation of the phase relation between the at least two different magnetic field components. The reference signal can however of course be produced also using additional magnetic field sensors, as is described in more detail herein.

Embodiments of the device enable precise detection of whether a limit marked by a magnetic alternating field has been crossed by an object or by a person without a constant component requiring to be superimposed upon the magnetic field used for marking the limit. Rather, for example synchronous detection is effected using a reference signal. Hence it becomes possible to mark the limit to be marked for example by a magnetic field, the temporal course of which is at least approximately sinusoidal. The magnetic field used for the marking in some embodiments need not have a constant component. Furthermore, it is not required that the magnetic field used for the marking has a significant harmonic component, as is the case in many conventional solutions. Hence, particularly simple generators can be used to produce the magnetic field used for marking the limit. As a result, the costs required to achieve the concept according to the invention can be significantly lowered.

In addition, some embodiments make it possible by use of a reference signal and by evaluation of a phase relation between the magnetic field sensor signal and reference signal to achieve a particularly low-interference position determination. Thus the mentioned phase relation is substantially affected for example neither by a disruptive magnetic constant field nor by other disruptive magnetic alternating fields. This applies all the more when, with some embodiments, only a significant change in phase relation, for example by approx. 180°, is evaluated.

In summary, it can hence be stressed that embodiments of the present invention make it possible to produce a particularly economical system for detecting whether an object or a person has crossed a marked limit.

In some embodiments, it is made possible to detect leaving and re-entry of the marked region automatically. Hence in some embodiments, the use of a second cable for detecting whether an area has been entered or left can be dispensed with. Furthermore, when producing the magnetic field for marking the limit, the operation can take place with a sinusoidal signal (for example without a substantial constant component and without substantial harmonic components), as a result of which the marking of the limit, in comparison with some existing systems, is substantially simplified.

According to one embodiment of the present invention, the evaluator is designed to prevent provision of information which indicates that the object or the person has crossed the marked limit if a change in the phase relation between the magnetic field sensor signal, delivered by the first magnetic field sensor, and the reference signal is effected on the basis of a rotation of the device.

The mentioned improvement is based on the knowledge that the phase position of the reference signal can be changed for example by a rotation of the device or of the object or the person who/which is equipped with the device. A rotation of the device (or of the object provided with the device or the person provided with the device) is however not intended to be detected as crossing the marked limit. In this respect, the reliability in some embodiments can still be improved notably in that it is detected if a phase relation between the magnetic field sensor signal and the reference signal changes not because of crossing the marked limit but because of a rotation of the device. Hence the concept described here can be used also in those situations in which a rotation of the device can be effected within the alternating field used for marking the limit. The reliability of the concept described here can hence be significantly increased in some embodiments.

According to one embodiment, the device can have, for the mentioned purpose, a reference signal corrector which is designed, on the basis of an original reference signal and information relating to a rotation of the device relative to the magnetic alternating field, to produce a phase-corrected reference signal. In this way, it can for example be reliably prevented that the reference signal changes substantially on the basis of a rotation of the device in the magnetic alternating field with respect to its phase position. The corrected reference signal can hence be used to determine the phase relation and to produce the information which indicates that the object or the person has crossed a marked limit.

In one embodiment, the device can have a rotation detector which is designed to detect a rotation of the device relative to the magnetic alternating field on the basis of information relating to at least one of the magnetic field components. In other words, it is not absolutely necessary to have any additional sensors for detecting possible rotations of the device, which sensors would unnecessarily increase the cost of the device according to the invention. Rather, magnetic field sensors which are present in any case can be resorted to in order to detect the rotation of the device.

In one embodiment, the device includes, in addition to the above-mentioned two magnetic field sensors, a third magnetic field sensor which is designed to detect a third magnetic field component of the magnetic alternating field. The rotation detector can be designed for example to detect the rotation of the device relative to the magnetic alternating field on the basis of a sensor signal delivered by the second magnetic field sensor and on the basis of a sensor signal delivered by the third magnetic field sensor. In other words, in the case of a device with in total at least three magnetic field sensors, two of the magnetic field sensors can be used advantageously to produce, on the one hand, a reference signal and, on the other hand, to compensate for rotations of the device. The magnetic field sensor signal of a further magnetic field sensor can furthermore be used essentially for the main functionality of the device, namely for detecting whether the marked limit has been crossed. It has been shown that, in some embodiments, particularly high reliability of the system can be achieved by using in total three magnetic field sensors.

In a further embodiment, the device includes a reference signal producer which is designed to determine the reference signal as a function of at least two magnetic field sensor signals from at least two magnetic field sensors. Such a determination of the reference signal as a function of at least two magnetic field sensor signals makes possible particularly high reliability of the reference signal. Hence the phase relation between the reference signal and the magnetic field sensor signal can be determined particularly reliably by the first magnetic field sensor, as a result of which also crossing of the marked limit can be detected particularly reliably.

In one embodiment, the device includes in total three magnetic field sensors which are designed to detect at least three different magnetic field components of the magnetic alternating field. The reference signal generator is designed to determine the reference signal as a function of a magnetic field sensor signal of the second magnetic field sensor and as a function of a magnetic field sensor signal of the third magnetic field sensor. It is made possible by means of the mentioned procedure to use two magnetic field components, which are detected by the second magnetic field sensor and the third magnetic field sensor, specifically for production of the reference signal, and furthermore to evaluate a phase relation between a further magnetic field component which is detected by the first magnetic field sensor and the reference signal. By using three magnetic field components, the entire three-dimensional structure of the magnetic field is hence evaluated, as a result of which very good reliability is produced. Thus in the mentioned embodiment, the reference signal can be produced if necessary even independently of the magnetic field sensor signal delivered by the first magnetic field sensor, which makes possible particularly high quality in the evaluation of the phase relation.

Further embodiments are defined furthermore by the dependent patent claims.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

Embodiments of the present invention are explained subsequently in more detail with reference to the accompanying Figures.

FIG. 1a is a block diagram of a device according to the invention for detecting if an object or a person crosses a limit marked by a magnetic alternating field;

FIG. 1b is a schematic representation of a magnetic field which is produced by a conductor which is subjected to a flow of alternating current, at various times;

FIG. 9 is a flow chart of a method, according to an embodiment of the invention;

FIG. 10a is a schematic representation of a playing area according to an embodiment of the invention;

Figure 2:
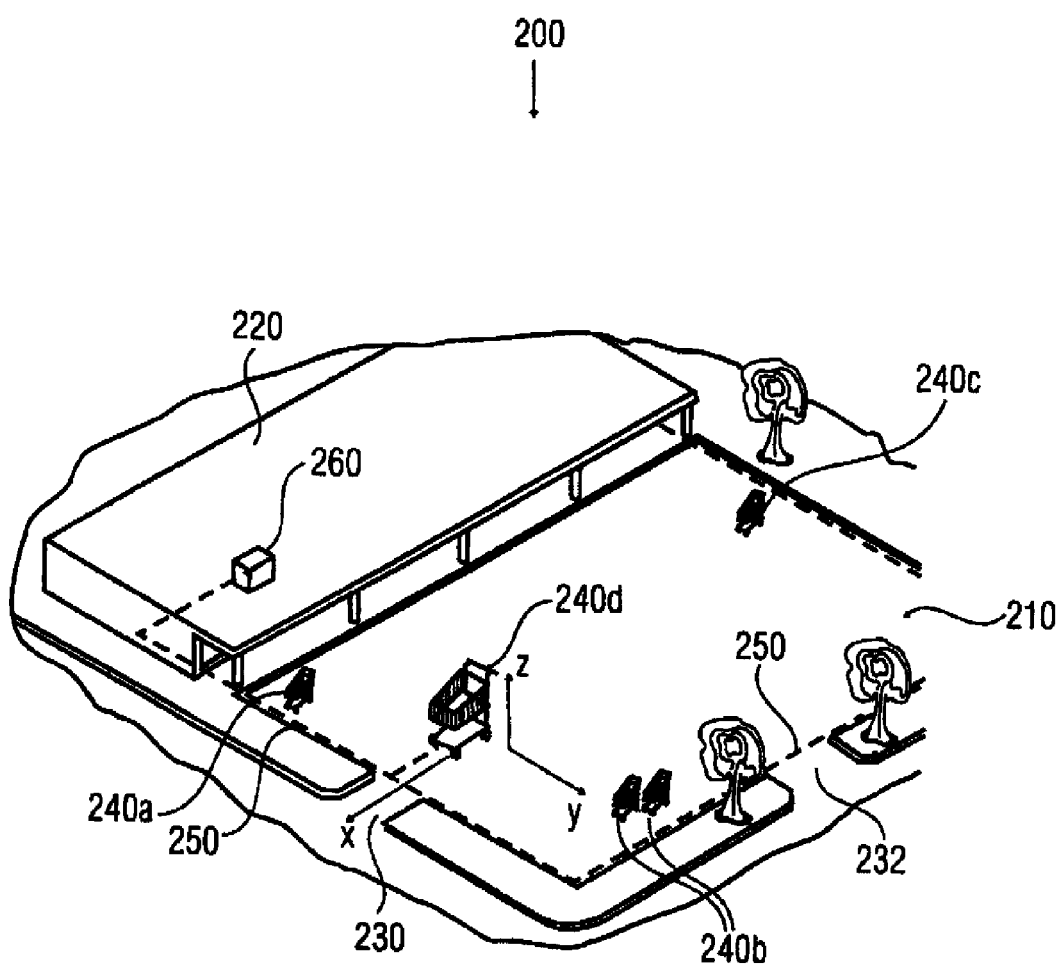
FIG. 2 is a schematic representation of an application scenario for the device according to claim 1.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1a shows a block diagram of an embodiment of a device for detecting if an object or a person crosses a limit marked by a magnetic alternating field. The device according to FIG. 1a is designated in its entirely with 100.

The device 100 includes a first magnetic field sensor 110. The first magnetic field sensor 110 is designed to detect a first magnetic field component of the magnetic alternating field in order to deliver an associated magnetic field component signal 112.

The device 100 includes furthermore a second magnetic field sensor 120 which is designed to detect a second magnetic field component of the magnetic alternating field. The second magnetic field sensor can deliver for example an associated magnetic field sensor signal 122. A magnetic field main sensitivity direction of the second magnetic field sensor 120 differs for example (but not necessarily) from a magnetic field main sensitivity direction of the first magnetic field sensor.

The device 100 includes furthermore an evaluator 130. The evaluator 130 is designed to receive the magnetic field sensor signal 112 delivered by the first magnetic field sensor 110. Furthermore, the evaluator 130 is designed to receive a reference signal 132. The reference signal 132 can directly concern, in the simplest case, the magnetic field sensor signal 122 delivered by the second magnetic field sensor 120. The reference signal 132 can however be produced also by an optional processing device 140, using the magnetic field sensor signal 122 delivered by the second magnetic field sensor 120 or on the basis of the magnetic field sensor signal 122 delivered by the second magnetic field sensor 120.

The evaluator 130 is designed for example to determine a phase relation (e.g. a phase difference) between the associated magnetic field sensor signal 112 delivered by the first magnetic field sensor 110 and the reference signal 132 which is based on detection of the second magnetic field component by the second magnetic field sensor 120. The evaluator 130 is furthermore designed for example to deliver information 134, in response to a change in the mentioned phase relation, which indicates that the device 100 or an object or a person who is provided with or connected to the device 100 has crossed the marked limit.

On the basis of the above structural description of the device 100, the mode of operation of the device 100 is described subsequently. It is thereby assumed therefrom that a specific limit or limit line is marked by a magnetic field, for example by a magnetic alternating field. However, reference may be made explicitly to the fact that embodiments of the device can also be used, with slight modifications, when the limit is marked by a magnetic constant field.

It is assumed in the following that a limit or a limit line is marked by a magnetic alternating field. It is assumed that the magnetic alternating field is concentrated spatially for example along the limit or limit line. As a result, the result generally is that the magnetic alternating field has significant non-homogeneity in the region of the limit or limit line. The corresponding non-homogeneity is reflected for example in the fact that one of the magnetic field components, at a fixed time determined in the vicinity of the limit, has different orientations at different places.

Furthermore, reference may be made to the fact that there is understood by a magnetic field component a component of the three-dimensional magnetic alternating field along a specific direction. If for example a coordinate system with the directions x, y, z is assumed, then for example a first magnetic field component can be formed by the component of the magnetic field in the z direction. A second magnetic field component can be formed for example by the component of the magnetic field in the x direction. A third magnetic field component can be formed for example by the component of the magnetic field in the y direction. In some embodiments, the x direction, y direction and z direction can be for example respectively orthogonal to each other.

For further clarification, FIG. 1b shows a schematic representation of a magnetic field which is produced by a conductor which is subjected to a flow of alternating current.

A first schematic representation 150 shows the magnetic field at a time $t=t_0$ and a second schematic representation 170 shows the magnetic field at a time $t=t_0+T/2$, T/2 being half a period duration of the current flowing through the conductor. The conductor through which current is flowing is designated respectively with 152 in the graphic representations 150, 170 of FIG. 1b. A coordinate system which comprises the directions x, y and z is designated furthermore with 154. At a first position 156, a magnetic field is applied at the time $t=t_0$, which has a component (or a portion) $H_x$ in positive x direction and a component $H_z$ in positive z direction. At a second position 158, a magnetic field is applied at the time $t=t_0$, which has a component $H_x$ in positive x direction and a component $H_z$ in negative z direction.

At the time $t=t_0+T/2$ (i.e. half a period duration of the alternating current signal later), the directions of all the magnetic fields have reversed. At the first position 156, a magnetic field with a component $H_x$ in negative x direction and with a component $H_z$ in negative z direction is therefore applied at the time $t=t_0+T/2$. Furthermore, at the time $t=t_0+T/2$, a magnetic field with a component $H_x$ in negative x direction and with a component $H_z$ in positive z direction is applied at the second position 158.

It is hence evident from FIG. 1b that the magnetic field component $H_z$ in the z direction at a prescribed time (e.g. at the time $t=t_0$ or at the time $t=t_0+T/2$) has at the positions 156, 158 respectively different directions. However, it is likewise evident that the magnetic field component $H_z$ changes its direction over time also at a single position, for example at the first position 156. Merely detection of the direction of the magnetic field component $H_z$ in the z direction is hence insufficient, in some embodiments, to obtain information about whether the device 100 is situated at the first position 156 or at the second position 158.

However, it is also evident from FIG. 1b that the magnetic field components $H_x$ and $H_z$ in the x direction and z direction at the first position 156 point, both at the first time, in the same directions (in positive directions) and, at the second time ($t=t_0+T/2$), in the same directions (negative directions). In other words, the magnetic field components $H_x$ and $H_z$ in the x direction and z direction are in phase at the first position 156 (at least when using an unaltered coordinate system 154). At the second position 158, the magnetic field component $H_x$ in the x direction and the magnetic field component $H_z$ in the z direction at the time $t=t_0$ have different orientations, the magnetic field component $H_x$ pointing at the time $t=t_0$ in positive x direction while, in contrast, the magnetic field component $H_z$ at the same time points in negative z direction. At the time $t=t_0+T/2$, the magnetic field component $H_x$ at the position 158 points in the negative x direction while, in contrast, the magnetic field component $H_z$ at the position 158 points in the positive z direction. Hence it can be stressed that the magnetic field components $H_x$ and $H_z$ in the x direction and z direction at the second location 158 are in antiphase or have a phase shift of 180°.

Hence, when using a magnetic alternating field for marking a limit, the orientation of a magnetic field component at a single time has no meaningful value with respect to the position at which the device is situated. An evaluation of a phase relation (e.g. "in-phase" or "in antiphase") between two different magnetic field components (e.g. in magnetic field components $H_x$ and $H_z$) enables however also determination in a magnetic alternating field of a position at which the device is situated.

With reference to the example of FIG. 1b, it can be concluded for example that the device is situated at the first position 156 (or, more generally, on a first side or to the left of the conductor 152 which is subjected to a current) if it is established that the magnetic field components $H_x$ and $H_z$ are in phase or are equiphase. Furthermore, it can be concluded that the device at the second position 158 (or, more generally, situated on a second side or to the right of the conductor 152 which is subjected to a flow of current) if it is established that the magnetic field components $H_x$ and $H_z$ are out of phase or in antiphase.

Furthermore, reference may be made to the fact that a phase relation between the magnetic field components $H_x$ and $H_z$ changes for example with high precision when the device is situated at a third position 160, the third position 160 being situated for example with high precision above the conductor 152 which is subjected to a flow of current (or at the limit between two regions).

If hence for example the first magnetic field sensor 110 of the device 100 detects the magnetic field component $H_z$ in the z direction and if furthermore the second magnetic field sensor 120 of the device 100 detects the magnetic field component $H_x$ in the x direction, the evaluator 130, for example in a simplest case, can come to a conclusion, by determining the phase relation between the magnetic field sensor signals 112 and 122 of the two magnetic field sensors 110, 120, as to whether the device is situated to the left of the conductor 152 which is subjected to a flow of current or to the right of the conductor 152 which is subjected to a flow of current. A change in the phase relation between the magnetic field sensor signals 112, 122 hence indicates the fact that the device has crossed the limit between a first region, e.g. a region on the left side, to the left of the conductor 152 which is subjected to a flow of current, and a second region, e.g. a region on the right side, to the right of the conductor 152 which is subjected to a flow of current. Hence the evaluator 130, in response to a change in the phase relation between the magnetic field sensor signals 112, 122, can deliver the information 134 in a very reliable manner, which indicates that the device (or the object or the person who is provided with the device 100) has crossed the marked limit.

With respect to the device 100, reference may be made to the fact that of course the reference signal 132 need not necessarily correspond directly to the magnetic field sensor signal 122 delivered by the second magnetic field sensor 120. Rather the reference signal 132 can also be produced using additional signal improving mechanisms or correction mechanisms using the magnetic field sensor signal 122 delivered by the second magnetic field sensor 120, as is described in more detail herein. However this changes nothing in the fundamental mode of operation, as was described with reference to FIG. 1a and 1b.

A typical application scenario in which the device 100 can be used is subsequently described. For this purpose, FIG. 2 shows a functional principle of a shopping trolley theft system or a shopping trolley theft protection system. In other words, FIG. 2 shows a schematic representation of a scenario in which the device 100 according to FIG. 1 can be used. The system according to FIG. 2 is designated in its entirety with 200.

FIG. 2 shows quite generally an area of a shop or of a shopping centre. The area includes for example a forecourt or car park 210 and also a shop building 220. The forecourt or car park 210 is for example disposed outside the shop building 220. The forecourt or car park 210 can however also be part of the shop building 210 or be covered over for example. The forecourt or car park 210 includes furthermore for example one or more exits 230, 232 by means of which leaving the forecourt or car park 210 is possible.

On the car park 210 and in the shop building 220, customers or employees can essentially move for example shopping trolleys 240a, 240b, 240c, 240d around freely.

However, in some embodiments, it is intended to be avoided that the shopping trolleys leave the region of the shop building 220 or of the forecourt or car park 210. For this purpose, for example an outer periphery of the car park or forecourt 210, i.e. the region in which the shopping trolleys 240a, 240b, 240c, 240d are allowed to be moved, is marked. The outer periphery of the mentioned region can be marked for example by a magnetic field. In some embodiments, it is preferred that the outer periphery of the mentioned region, within which the shopping trolleys 240a to 240d are allowed to be moved, is marked by a magnetic alternating field. The magnetic alternating field can be produced for example by a current flow which is produced in a laid cable 250, characterized by a broken line. The cable can be laid for example along a surface in the form of a flat cable. Alternatively, the cable can however be laid also underground, i.e. for example buried. The current flow in the cable 250 can be produced for example by a generator 260. The generator can be disposed at any position, for example within the shop building 220, as is shown in FIG. 2.

Figure 3:
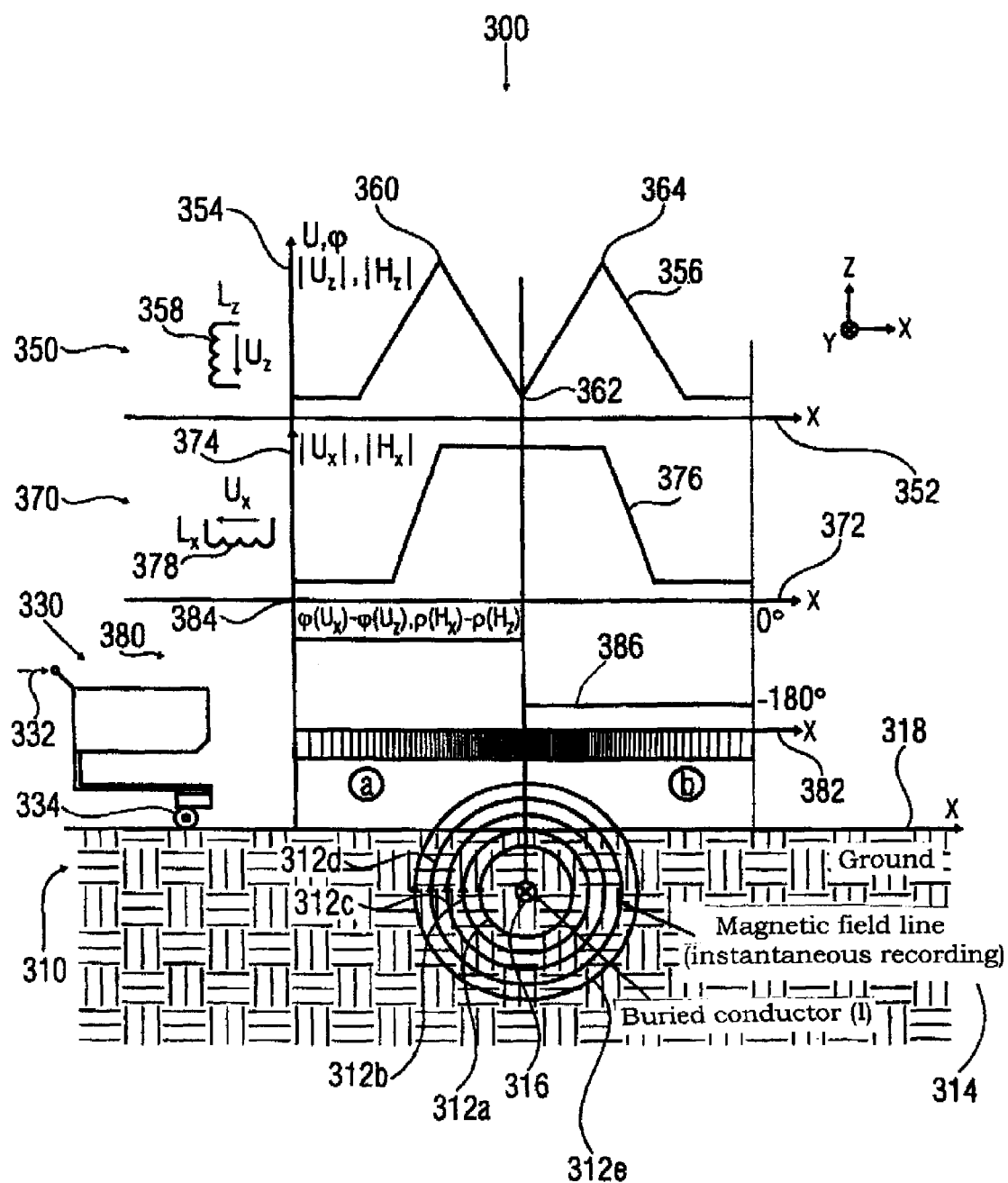
FIG. 3 is a schematic representation of a cross-section through a limit marked with a magnetic field.

Further details are explained subsequently with reference to FIG. 3. FIG. 3 shows, for this purpose, a cross-section through an arrangement with a cable laid below ground. The graphic representation according to FIG. 3 is designated in its entirety with 300. In other words, FIG. 3 shows a cross-section through the cable and the ground.

In a cross-sectional representation 310, FIG. 3 shows an instantaneous recording of magnetic field lines 312a-312e which are produced by a conductor 316 buried in the earth region (or ground region) 314. With respect to the field lines, reference may be made to the fact that a large part of the field lines 312a-312e extend in the earth 314, i.e. below a surface or ground surface 318, since in fact the conductor 316 is buried in the ground 314 (or in general below the surface 318). A certain part of the field lines 312c-312e extends however in the region above the surface or ground surface 318, as is shown in FIG. 3.

Furthermore, reference may be made to the fact that, in the cross-sectional representation 310, directions of the field lines 312a-312e are indicated by arrows. The corresponding field direction is produced for example at a time at which a current flow prevails in the buried conductor 316 into the drawing plane (indicated by the symbol ⊗). If however an alternating current flows in the buried conductor 316, then a reverse current direction is present after half a period duration. Hence, after half a period duration of the alternating current, the directions of the magnetic field or the directions of the field lines 312a-312e are reversed.

Furthermore, a shopping trolley 330 which can be pushed by a force 332 along the surface or ground surface 318 is shown in FIG. 3. The shopping trolley 330 includes for example a rotatably mounted front wheel component 334. A device 100, as was described with reference to FIG. 1a, can be fitted on the rotatably mounted front wheel component 334. In some embodiments, the device 100 can even be disposed within the front wheel component 334.

It is explained subsequently which magnetic fields occur at the position of the front wheel component 334 if the shopping trolley 330 is moved in the x direction along the surface 318 (which can concern a ground surface or a surface of a ground covering).

A graphic representation 350 qualitatively describes a local course of a magnetic field strength along the x direction. The x position is plotted on an abscissa 352 and a value $|H_z|$ of a component of the magnetic field strength H in the z direction is plotted on an ordinate 354. A curve which describes the value $|H_z|$ of the z component of the magnetic field strength as a function of a position in the x direction is designated with 356. Furthermore if it is assumed that the magnetic field strength component in the z direction is detected, i.e. $H_z$, by a coil 358, the axis of which extends in the z direction, then the voltage $U_z$ induced in this z coil 358 is, from its value $|U_z|$, at least approximately parallel to the z component $H_z$ of the magnetic field strength H. In this respect, the curve 356 describes not only a local course of the value of the magnetic field strength in the z direction ($|H_z|$) but also the value of the voltage $|U_z|$ induced in the z coil 358.

However, reference may be made to the fact that a phase shift can exist between the voltage $U_z$ induced in the z coil and the z component $H_z$ of the magnetic field strength, as is well known to the person skilled in the art.

It is evident from the graphic representation 350 that the value $|H_z|$ of the z component of the magnetic field strength H is very low at a great distance from the conductor 316 which is subjected to a flow of current. This results simply from the fact that the magnetic field strength, in an idealised case, is inversely proportional to the spacing from the conductor 316 which is subjected to a flow of current. When approaching the conductor which is subjected to a flow of current, the z component of the magnetic field strength rises increasingly. However, the value of the z component of the magnetic field strength, in the ideal case, assumes a value of zero at a location vertically above the conductor which is subjected to a flow of current. This can be easily understood with reference to the field lines 312a-312e. Vertically above the conductor 316 which is subjected to a flow of current, the field lines extend mainly horizontally in the ideal case. In other words, when approaching the conductor which is subjected to a flow of current, the value of the z component of the magnetic field strength increases, starting from a very low value initially to a maximum value 360 and then drops again upon further approach to the conductor 316. At a position vertically above the conductor 316 which is subjected to a flow of current, the value of the z component of the magnetic field strength returns, in the ideal case, in fact to a minimum value 362 of approx. zero. During a further movement, the value of the z component of the magnetic field strength increases again in order to reach a second maximum value 364. Thereupon, the value of the magnetic field strength drops again with a further movement away in the x direction.

A further graphic representation 370 describes a local course of an x component of the magnetic field strength. An abscissa 372 describes a position in the x direction and an ordinate 374 describes a value of the x component of the magnetic field strength.

A curve 376 describes the value of the x component of the magnetic field strength as a function of the x coordinate. The value of the x component of the magnetic field strength H is designated with $|H_x|$. The value $|H_x|$ of the x component of the magnetic field strength is very low at a large spacing from the conductor 316 which is subjected to a flow of current. Upon approaching the conductor 316 which is subjected to a flow of current, the value of the x component of the magnetic field strength initially increases rapidly and then remains, in the vicinity of the conductor 316 which is subjected to a flow of current, at an at least approximately uniformly high level. After crossing the conductor, the value of the x component of the magnetic field strength finally drops again.

Furthermore, reference may be made to the fact that the x component of the magnetic field strength can be detected for example by a coil 378, the axis of which is orientated in the x direction. A value of the voltage (also designated with $|U_x|$) induced in the x coil 378 is for example at least approximately proportional to a value of the x component of the magnetic field strength. A phase shift, e.g. by 90°, can exist between the voltage $U_x$ induced in the x coil 378 and the x component $H_x$ of the magnetic field strength H.

As shown in the graphic representations 350, 370, no differences exist between a region to the left of the conductor 316 which is subjected to a flow of current and a region to the right of the conductor 316 which is subjected to a flow of current, at least in the ideal case, with respect to the values of the components $H_x$ and $H_z$ of the magnetic field strength.

In a graphic representation 380, a phase shift between the x component $H_x$ and the z component $H_z$ of the magnetic field strength H is shown. An abscissa 382 describes in turn the x coordinate and an ordinate 384 describes a phase shift $\phi(H_x)-\phi(H_z)$. The phase shift between the voltage $U_x$ induced in the x coil 378 and the voltage $U_z$ induced in the z coil 358, which is also designated with $\phi(U_x)-\phi(U_z)$, essentially corresponds to the phase shift between the x component of the magnetic field strength and the z component of the magnetic field strength.

A course of the mentioned phase shift as a function of the x coordinate is described by a curve 386. As is shown in the graphic representation 380, the phase shift in a region to the left of the conductor 316 which is subjected to a flow of current (also designated with "a") is for example approx. 0°. It is evident therefore from FIG. 3 that the field lines 312a-312e extend in a region to the left of the conductor 316 which is subjected to a flow of current and above the surface 318 to the right at the top, i.e. in positive x direction and positive z direction. In a region to the right of the conductor 316 which is subjected to a flow of current and is also characterized with "b", the mentioned phase shift $\phi(H_x)-\phi(H_z)$ is 180° or −180°. Thus it is readily evident from FIG. 3 that, in the region "b" to the right of the conductor 316 which is subjected to a flow of current and above the surface 318, the magnetic field lines extend to the right downwards, i.e. in positive x direction and in negative z direction.

Hence, crossing a limit which is marked by the magnetic field and extends in vertical direction, i.e. the limit between the regions "a" to the left of the conductor which is subjected to a flow of current and "b" to the right of the conductor 316 which is subjected to a flow of current, can be detected by evaluation of the phase difference $\phi(H_x)-\phi(H_z)$ or the phase difference $\phi(U_x)-\phi(U_z)$. Furthermore, this also applies when the conductor 316 which is subjected to a flow of current is subjected to a flow by an alternating current since the shown course of the phase shift exists independently of time.

Furthermore, reference may be made to the fact that magnetic field sensor signals which describe the magnetic field strength (or a corresponding magnetic flux density) can be produced not only by coils but also by other sensors. Thus, instead of the x coil 378, any other magnetic field sensors can be used to detect the x component of the magnetic field strength. For example a Hall magnetic field sensor can be used instead of a coil to detect the magnetic field strength or the magnetic flux density. As an alternative, also any other sensors which make it possible to detect at least one direction of the magnetic field strength or of the magnetic flux density can be used. Also the z coil 358 can of course be replaced by any magnetic field sensor as long as it is possible to detect hence the direction of the magnetic field strength or of the magnetic flux density.

Figure 4:
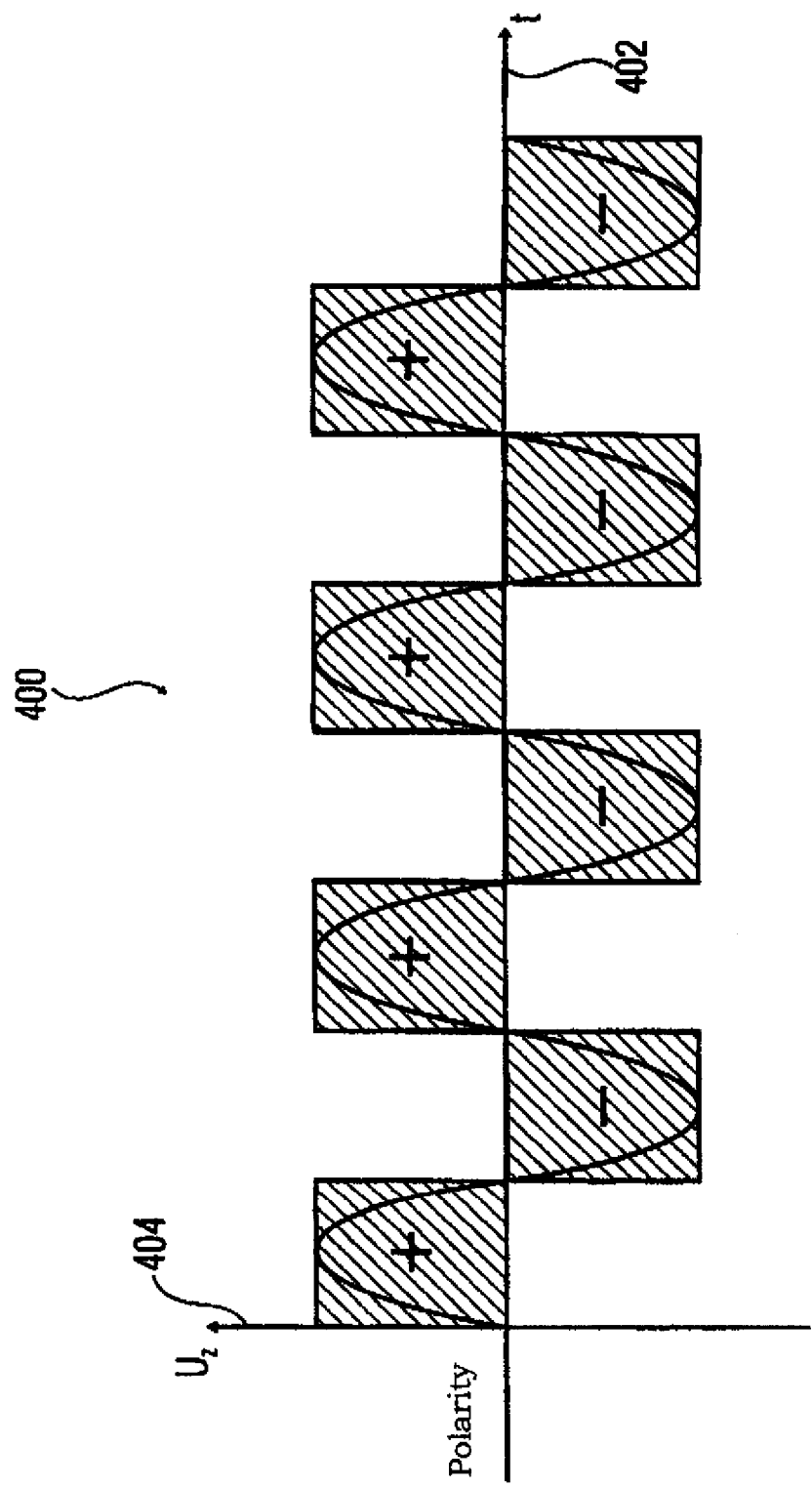
FIG. 4 is a graphic representation of a polarity of a signal delivered by a magnetic field sensor.

FIG. 4 shows furthermore a schematic representation of a temporal course of the voltage $U_z$ induced in the z coil 358. The graphic representation of FIG. 4 is designated in its entirety with 400. The time t is plotted on an abscissa 402. The voltage $U_z$ induced in the z coil 358 is plotted on an ordinate 404. If it is assumed that a current flow is impressed in the conductor 316 which is subjected to a flow of current, which current flow is at least approximately sinusoidal, then the voltage $U_z$ induced in the z coil 358 is likewise approximately sinusoidal, as is evident from FIG. 4. As shown in FIG. 4, time intervals exist, during which the voltage $U_z$ is greater than zero, $U_z$ therefore has a positive polarity ("+"). Furthermore, time intervals exist, during which the voltage $U_z$ has a negative polarity ("−").

A few problems are explained subsequently with reference to FIGS. 5, 6 and 7, which problems result during the evaluation of the phase relation between the x component of the magnetic field strength and the z component of the magnetic field strength. In addition, a device with which the subsequently clarified problems can be resolved is described with reference to FIG. 8.

Figure 5:
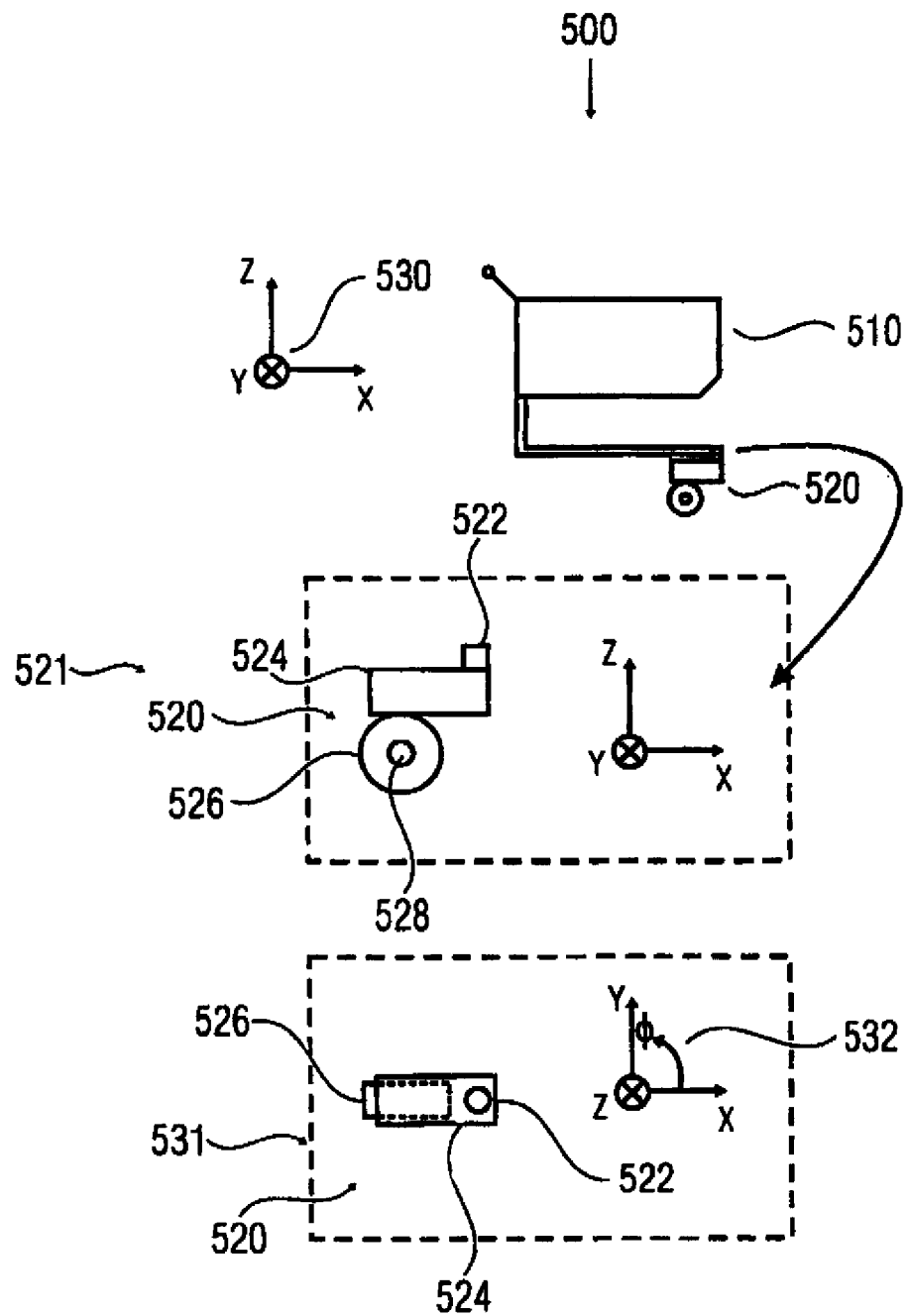
FIG. 5 is a graphic representation of a sensor coordinate system for coils on a trolley wheel.
Figure 6:
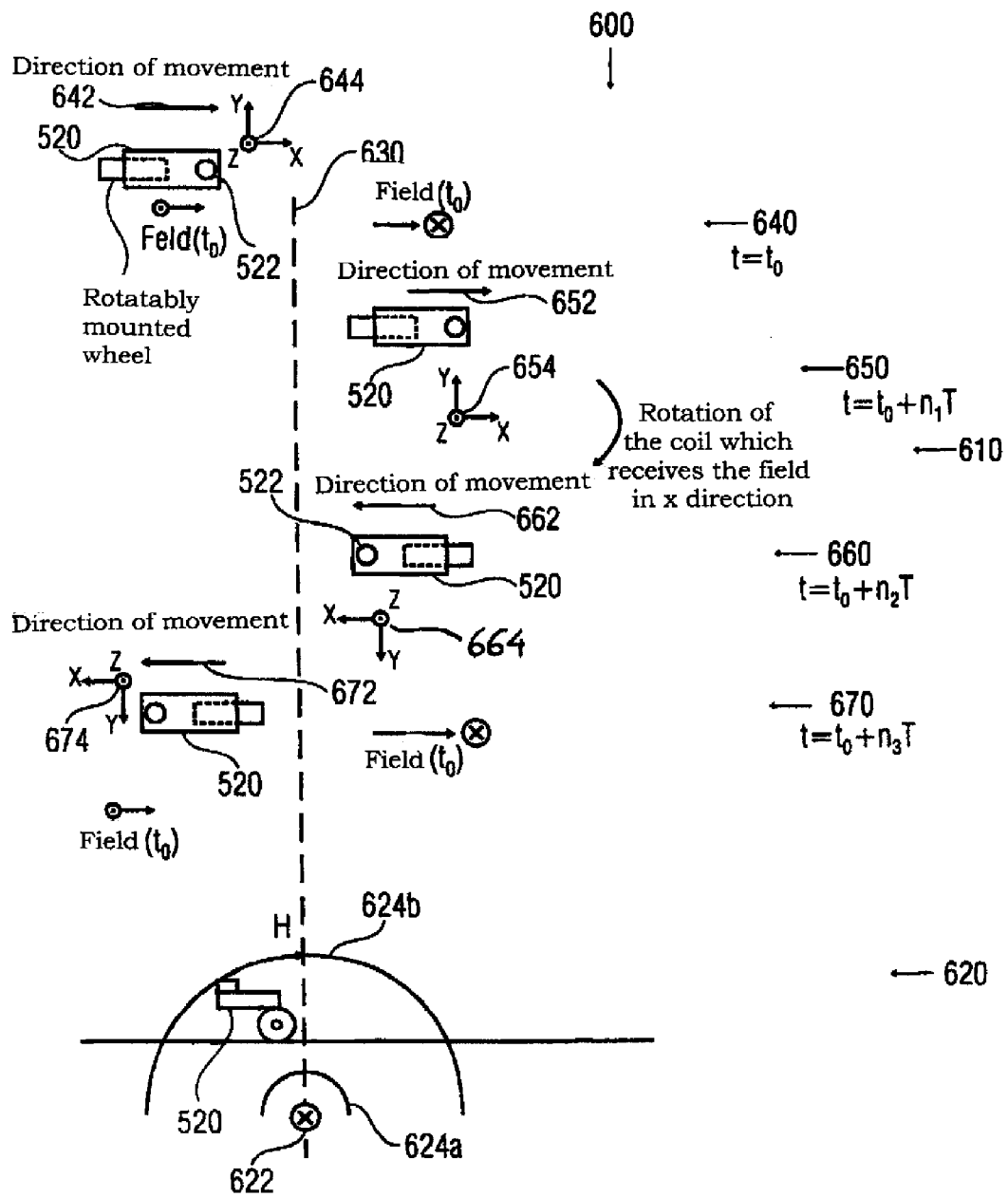
FIG. 6 is a schematic representation which describes a possible movement of a trolley wheel.

FIG. 5 shows a schematic representation of a subsequently used coordinate system, for example a coordinate system for coils (or magnetic field sensors) on the edge of a trolley. The schematic representation according to FIG. 5 is designated in its entirety with 500. The representation 500 shows a shopping trolley 510 with a rotatably mounted front wheel component 520. Furthermore, a coordinate system 530 is shown. The coordinate system 530 concerns for example a rectangular or Cartesian coordinate system. The x direction is plotted to the right for illustration. The y direction extends in the drawing plane. The z direction extends upwards.

Furthermore, FIG. 5 shows an enlarged schematic representation of the rotatably mounted front wheel component 520. A schematic representation 521 shows a side view of the front wheel component 520. The front wheel component 520 includes a rotatably mounted axle 522 which, at least approximately, extends in the vertical direction, i.e. in the z direction. The front wheel component 520 includes furthermore a body 524. The actual wheel 526 is fitted rotatably on the body 524. The wheel 526 is fitted mounted rotatably about an axle 528 which extends essentially in the y direction.

Reference may be made here to the fact that FIG. 5 should be understood not as a detailed mechanical illustration but merely as a schematic drawing. FIG. 5 essentially serves to describe schematically, by way of example, in which directions the individual components can be disposed or how a coordinate system, given by way of example, can be defined. Another definition of the coordinate system of course changes nothing with respect to the factual content described here.

A further schematic representation 531 shows a plan view on the front wheel component 520. In the schematic representation 531, again the axis 520 (this time in plan view) which extends approximately in the z direction is evident. Furthermore, the body 524 of the wheel component 520 is shown in plan view. In addition, the schematic representation 531 shows a small part of the wheel 526, while a larger part of the wheel 526 is covered by the body 524 of the wheel component 520. This is indicated by a broken line. Furthermore, reference may be made to the fact that, in the schematic representation 531, the x direction extends to the right, the y direction extends upwards and the z direction extends out of the drawing plane, as is indicated by a coordinate system 532.

Reference may be made here to the fact that the magnetic field produced by the conductor which is subjected to a flow of current (e.g. the conductor 152, the cable 250 or the conductor 316) is evaluated respectively in a coordinate system of the corresponding device (e.g. the device 100). In other words, the position of the corresponding evaluation device (e.g. the device 100) relative to the magnetic field produced by the conductor which is subjected to a flow of current is decisive as to which magnetic field components are detected in the device (e.g. in the device 100). If it is assumed that the device 100 is disposed for example in the body 524 of the front wheel component 520, then the corresponding coordinate system rotates with the body 524 of the front wheel component 520. It can be said in general that the coordinate system of the device according to the invention, e.g. the device 100, jointly rotates with a rotation of the device according to the invention or of the object or of the person on whom/which the device according to the invention is applied.

This problem is explained subsequently in the example of a front wheel component of a shopping trolley with reference to FIG. 6 and FIG. 7. FIG. 6 shows a schematic representation of a scenario in which the device according to the invention (e.g. the device 100) can be used. It is assumed with respect to FIG. 6 that the device according to the invention is fitted on the body 524 of the front wheel component 520 or is disposed in the body 524. The schematic representation of FIG. 6 is designated in its entirety with 600. The schematic representation 600 includes a plan view 610 which shows the front wheel component 520, as was described with reference to FIG. 5, in various states of movement. A cross-sectional representation 620 shows furthermore a cross-section through the entire arrangement, including a conductor which is subjected to a flow of current. In the plan view 610, a limit 630 which is marked by a magnetic field, e.g. a magnetic alternating field, is shown. The marked limit is characterized by a broken line 630. The plan view 610 shows an instantaneous recording of the magnetic field at a specific time $t_0$. At this time, the magnetic field emerges to the left of the limit 630 out of the drawing plane and extends to the right of the limit 630 into the drawing plane. A cross-section of the magnetic field in a conductor which is subjected to a flow of current is shown in the cross-sectional representation 620, magnetic field lines being designated with 624a and 624b. The position of the front wheel component 520 at a time $t_0$ is shown in a first line 640 of the plan view 610. The front wheel component 520 is situated at the time $t=t_0$ to the left of the marked limit 630 and moves to the right, i.e. towards the limit 630, as is indicated by the arrow 642. The axis 522 of the front wheel component 520 is situated during this direction of movement on the right side of the front wheel component 520, as can readily be comprehended. In the first line 640, an associated coordinate system 644 is illustrated in addition and is fixed on the front wheel component 520.

The situation at a second time $t=t_0+n_1T$ is shown in the second line 650 in the plan view 610. $n_1$ may be a whole number and T denotes a period duration of the magnetic alternating field or of the alternating current flowing in the conductor 622 which is subjected to a flow of current. At the second time, the front wheel component 520 is situated to the right of the marked limit 630 and moves to the right, as is indicated by a moving part 652. A coordinate system associated with the body 524 of the front wheel component 520 is designated with 654.

A third line 660 describes a state at the time $t=t_0+n_2T$. It is assumed that $n_2$ is a whole number, there applying: $n_2>n_1$. It is assumed that the front wheel component 520 at the third time moves to the left. In other words, a direction of movement at the third time (represented by a movement arrow 662) has reversed relative to the direction of movement at the second time (represented by the movement arrow 652). As can be readily understood, the body 524 of the front wheel component 520 is rotated. By reversal of the direction of movement at the third time, the axis 522 is hence essentially situated to the left of the body 524 of the front wheel component 520. In other words, the body 524 of the front wheel component 520 has rotated by approximately 180° between the second time (shown in the second line 650) and the third time (shown in the third line 660). Hence also the coordinate system assigned to the body 524 of the front wheel component 520 is rotated. The corresponding coordinate system at the third time is designated with 564.

At the second time and the third time, in particular a magnetic field sensor which detects an x component of the magnetic field (relative to the coordinate system fixed to the body 524) is hence rotated by 180°. Likewise, between the second time and the third time, a magnetic field sensor which detects the y component of the magnetic field (relative to the coordinate system fixed to the body 524) is hence rotated by 180°. A main sensitivity direction of a magnetic field sensor, which detects a magnetic field component in the z direction (relative to the coordinate system fixed to the body 524), remains in contrast unchanged between the second time and the third time. Hence it can be stressed that the rotation of the front wheel component 520 between the second time and the third time leads to the fact that for example a phase relation between an x component of the magnetic field (viewed in the coordinate system fixed to the body 524) and a z component of the magnetic field (evaluated in the coordinate system fixed to the body 524) changes by approximately 180°. This change in phase relation is not caused for instance by crossing the limit 630 between the second time and the third time (the limit 630 is in fact not crossed at all between the second time and the third time) but rather is caused by a rotation of the front wheel component 520 about the z axis.

Hence, a change in phase relation between the x component of the magnetic field and the z component of the magnetic field, for example, evaluated respectively in a coordinate system which is fixed for example to the front wheel component 520 (in general: on the device according to the invention), still does not make it possible per se in some cases (for example if the front wheel component 520 or, in general, the device according to the invention, is rotatable) to conclude unequivocally that the limit 630 has been crossed.

Hence a change in the mentioned phase relation occurs namely both when crossing the limit 630 marked by the magnetic field or the magnetic alternating field and during a rotation of the front wheel component 620 or device 100 about the z axis (by approx. 180°). The latter effect can be neglected if for example it is ensured that the front wheel component 520 does not rotate about the z axis if for instance for example a front wheel component which is fixed with respect to direction is used. The last-mentioned effect does not appear to be disruptive if the device according to the invention is guided such that a rotation about 180° is prevented in the vicinity of the marked limit 630.

For reasons of completeness, a fourth line 670 of the plan view 610 shows a state at a fourth time $t=t_0+n_3T$. $n_3$ is a whole number with $n_3>n_2$. At the fourth time, as is shown in the fourth line 670, the front wheel component 520 has again crossed the marked limit 630 and is situated on the left side of the marked limit 630. Furthermore, a movement to the left is assumed, as is represented by the arrow 672. A coordinate system 674 fixed to the body 524 of the front wheel component 520 has, at least approximately, the same orientation as the coordinate system 564 at the third time.

In summary, a rotation of the front wheel component 520 (or more generally of the device 100 according to the invention) involves the difficulty that the coordinate system fixed on the front wheel component 520 or on the device 100 jointly rotates. This rotation of the coordinate system fixed on the front wheel component 520 or on the device 100 can, in the least favourable case, lead to a change in the phase relation between two magnetic field components resulting which is caused solely by the rotation of the front wheel component 520 or of the device 100 and which is not caused by crossing the marked limit. Hence in some embodiments, the desire exists to detect such a change in the phase relation, caused by rotation, and to prevent the device 100 in this case wrongly indicating crossing of the magnetic limit (e.g. the limit 630).

Figure 7:
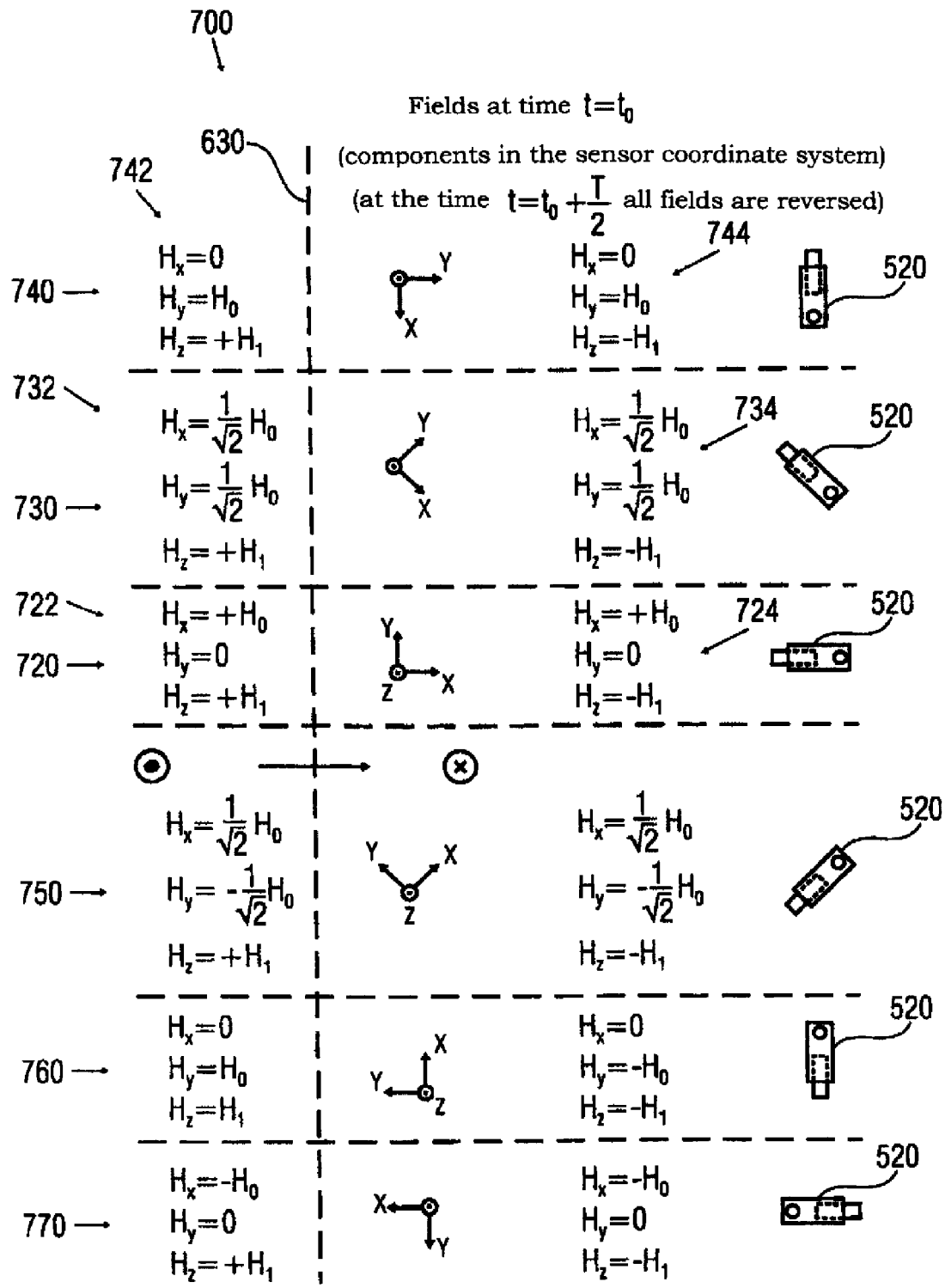
FIG. 7 is a schematic representation of magnetic field components in a sensor coordinate system for different orientations of the sensor coordinate system.

For further illustration, the tabular illustration of FIG. 7 describes the components $H_x$, $H_y$ and $H_z$ of the magnetic field in different orientations of a coordinate system with directions x, y and z.

The tabular representation of FIG. 7 is designated in its entirety with 700. The tabular representation of FIG. 7 shows a limit 630 which is marked by a magnetic field and characterized by a broken line. It is assumed here that the magnetic field has a configuration, as was explained for example with reference to FIG. 6. Furthermore, reference may be made to the fact that the representation according to FIG. 7 describes field components at a time t=$t_0$. At a time t=$t_0$+T/2, all the field components have a reverse direction and hence a reverse sign, as can be easily understood. With respect to the magnetic field, it is assumed that a field line of the magnetic field, given by way of example, at the time $t_0$, emerges from the drawing plane forwards to the left of the limit 630, crosses the limit 630 in front of the drawing plane from left to right and, on the right side of the limit 630, passes through the drawing plane from front to back. The tabular representation 7 shows for various cases corresponding coordinate systems which are rotated relative to each other and in which the magnetic field is evaluated. The rotation of the coordinate systems can correspond for example to a rotation of the front wheel component 520 or a rotation of the device 100 according to FIG. 1. The corresponding rotation of the front wheel component 520 is represented on the right side of the tabular representation according to FIG. 7.

A line 720 shows for example a first orientation of the front wheel component 520 which occurs if the associated shopping trolley crosses the limit 630 approximately vertically from left to right. If the front wheel component 520 is situated at a specific position to the left of the limit 630, then the magnetic field components designated with 722 can be detected in a coordinate system fixed to the front wheel component. If, in contrast, the front wheel component 520 is situated at a specific position to the right of the limit 630, then the magnetic field components designated with 724 can correspondingly be detected. A comparison of the magnetic field components 722 and 724 shows that their sign changes when crossing the limit 630 by means of the component $H_z$ in the z direction.

A line 730 describes the situation if the shopping trolley crosses the limit 630 diagonally, for example downwards to the right in the plan view of FIG. 7. If the front wheel component 520 is situated at the specific position to the left of the limit 630, then the components of the magnetic field designated with 732 occur there. If the front wheel of the shopping trolley, in contrast, is situated at the specific position to the right of the limit 630, then the magnetic field components designated with 734 occur there (relative to the coordinate system fixed to the front wheel component 520). It is evident from a comparison of the lines 720 and 730 that the magnetic field component in the z direction (i.e. $H_z$) remains unchanged while the magnetic field components in the x direction and y direction change in contrast.

A line 740 shows the situation if the shopping trolley is moved parallel to the limit 630. In the plan view according to FIG. 7, the shopping trolley can for example move downwards. If the front wheel component 520 is situated at the specific position to the left of the limit 630, then the magnetic field components designated with (742) can be detected in the coordinate system of the front wheel component 520. If, in contrast, the front wheel component 520 is situated at the specific position to the right of the limit 630, then the magnetic field components designated with 744 can be detected.

It is evident from line 720 that the magnetic field component in the x direction can be regarded as a reliable, large, with respect to quantity, reference signal if the shopping trolley or the front wheel component 520 crosses the limit 630 vertically or almost vertically. If, in contrast, the shopping trolley or the front wheel component 520 is moved almost parallel to the limit 630, then the magnetic field component in the x direction becomes small or becomes zero. It can then of course no longer serve as a reliable source for a reference signal (for determining a relative phase position of the magnetic field component in the z direction).

Lines 750, 760 show the magnetic field components in further situations or for further orientations of the front wheel component 520.

A line 770 shows the magnetic field components for a movement of the shopping trolley or of the front wheel component 520 from right to left. In other words, the lines 720 and 770 describe the situation for opposite directions of movement. It is evident from FIG. 7 that a reversal of the direction of movement which is associated with a rotation of the front wheel component 520 by 180° leads to a reversal of the phase relation between the x component of the magnetic field and the z component of the magnetic field. While the x component and the z component of the magnetic field are in phase to the left of the limit 730 in the situation according to the line 720, the mentioned magnetic field components to the left of the limit 630 are in antiphase in the situation according to the line 770. A reverse situation occurs to the right of the limit 630, as is evident from FIG. 7.

Figure 8:
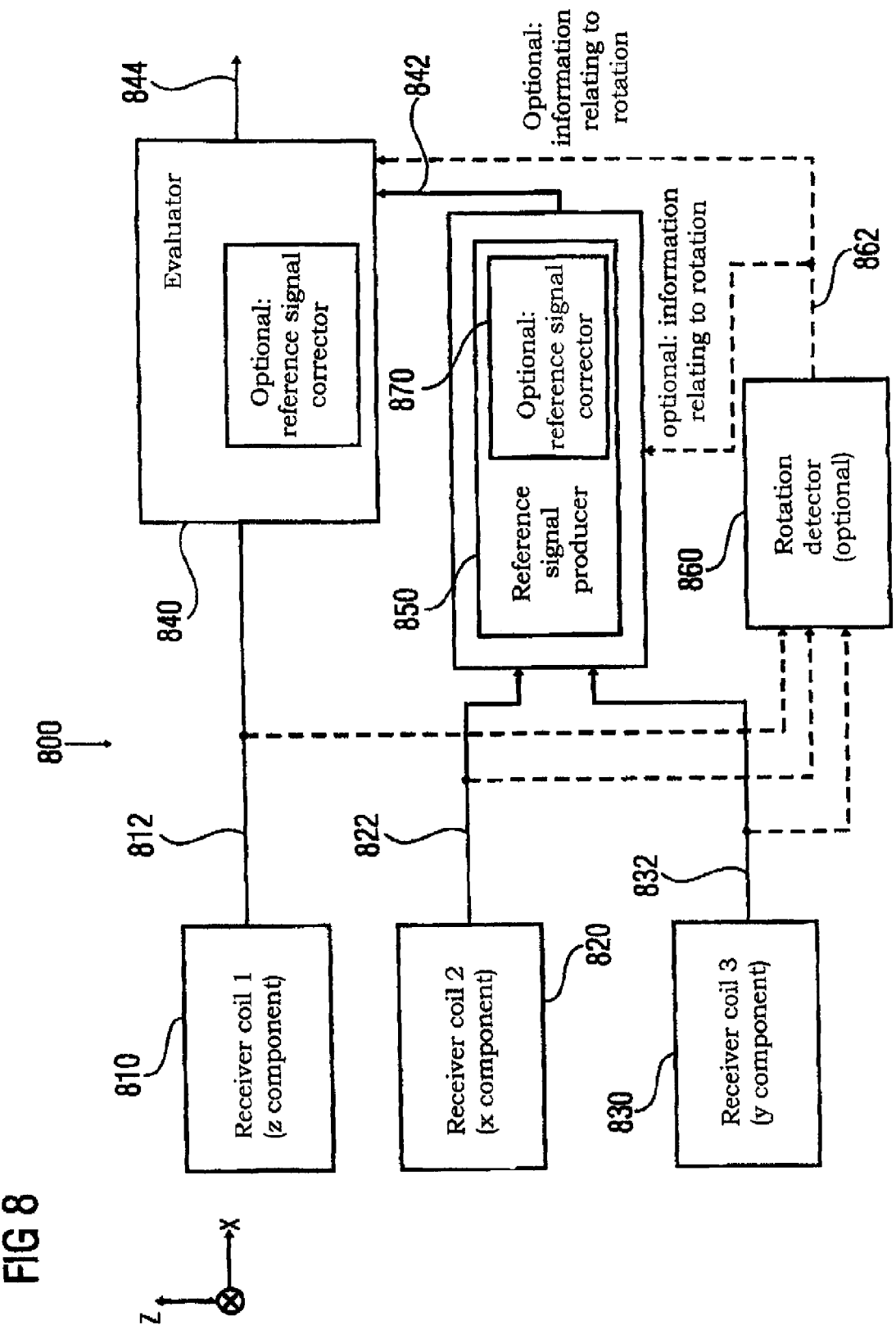
FIG. 8 is a block diagram of a device according to the invention, according to a further embodiment of the invention.

With reference to FIG. 8, it is explained subsequently how, despite the mentioned problems which result from the rotation of the front wheel component 520, or, in general, from the rotation of the device according to the invention, a reliable detection can be made possible in order to detect whether or when the device according to the invention has crossed the marked limit.

FIG. 8 shows a block diagram of a device according to the invention for detecting if an object or a person crosses a limit marked by a magnetic field. The device according to FIG. 8 is designated in its entirety with 800. The device 800 includes a first magnetic field sensor 810 which is designed for example to detect a first magnetic field component. In other words, the first magnetic field sensor 810 has a first main sensitivity direction. The first magnetic field sensor 810 concerns for example a magnetic field sensor which can determine not only the value of the magnetic field but which also enables detection of the direction of the magnetic field. According to an embodiment, the first magnetic field sensor 810 concerns a magnetic field sensor which is designed to detect a z component of the magnetic field (or of the magnetic flux density). In other words, the main sensitivity direction of the first magnetic field sensor (810) is orientated in the z direction in one embodiment. The first magnetic field sensor (810) can hence detect whether the component of the magnetic field is orientated for example in positive or in opposite, negative z direction.

The first magnetic field sensor 810 can be produced for example by a first receiver coil. This first receiver coil can also be termed z coil. The first magnetic field sensor 810 can however also be formed by another suitable sensor component, e.g. a Hall probe.

The device 800 includes furthermore a second magnetic field sensor 820. The second magnetic field sensor 820 is designed to detect a second component (e.g. an x component) of the magnetic field strength H or of the magnetic flux density B. In other words, the second magnetic field sensor 820 has an associated main sensitivity direction which is orientated for example in the x direction. The second magnetic field sensor 820, apart from the different orientation of the main sensitivity direction, can be very similar to the first magnetic field sensor 810. Thus it is preferred that the second magnetic field sensor 820 is able to detect a direction of the magnetic field strength or of the magnetic flux density, i.e. to differentiate for example a magnetic field strength in positive x direction from a magnetic field strength in negative x direction.

The second magnetic field sensor 820 can include for example a second receiver coil which can be also termed x coil. As an alternative thereto, other suitable sensor components, such as for example a Hall sensor component, can be used.

The device 800 includes furthermore a third magnetic field sensor 830 which is designed to detect a magnetic field component in a third direction. In other words, the third magnetic field sensor 830 has for example a main sensitivity direction which differs from the main sensitivity direction of the first magnetic field sensor 810 and also from the main sensitivity direction of the second magnetic field sensor 820. For example the third magnetic field sensor 830 can be designed to detect a y component of the magnetic field strength or a y component of the magnetic flux density. The third magnetic field sensor 830 is preferably designed to operate as orientation-sensitive in order for example to differentiate a magnetic field strength in positive y direction from a magnetic field strength in a negative y direction.

The third magnetic field sensor 830 can include for example a third receiver coil which can also be termed y coil. Alternatively, also other types of sensor components can however be used, e.g. one or more Hall sensor components.

In the above embodiments, it was assumed that the z direction is the main sensitivity direction of the first magnetic field sensor 810, that the x direction is the main sensitivity direction of the second magnetic field sensor 820 and that the y direction is the main sensitivity direction of the third magnetic field sensor 830. It was thereby assumed that the x direction, the y direction and the z direction correspond to the axes of a Cartesian coordinate system, i.e. are perpendicular to each other in pairs. However this is not absolutely necessary.

Quite generally, it is sufficient if the main sensitivity directions of the three magnetic field sensors 810, 820, 830 differ from each other. In one embodiment, the angle between the main sensitivity directions of the mentioned three magnetic field sensors is respectively at least 25°. In a further main sensitivity direction it is respectively at least 45°. In a further embodiment the main sensitivity direction of the first magnetic field sensor 810 is at least approximately perpendicular to a plane which is spanned by the main sensitivity directions of the second magnetic field sensor 820 and of the third magnetic field sensor 830. In this case, for example an acute angle between the main sensitivity direction of the first magnetic field sensor 810 and of the spanned plane can be at least 70°. Furthermore, an angle between the main sensitivity directions of the second magnetic field sensor 820 and of the third magnetic field sensor 830 in this case can be for example at least 45°.

In summary, the three magnetic field sensors 810, 820, 830 can be designed for example to detect three different components of a magnetic field strength or of a magnetic flux density. In some embodiments, the three different components can be perpendicular to each other in pairs.

The device 800 includes furthermore an evaluator 840 which is designed to receive a magnetic field sensor signal 812 from the first magnetic field sensor 810. The magnetic field sensor signal 812 describes for example a z component of the magnetic field strength or of the magnetic flux density.

The evaluator 840 is designed furthermore to receive a reference signal 842. Furthermore, the evaluator 840 is designed for example to determine a phase relation (e.g. a phase shift) between the magnetic field sensor signal 812 and the reference signal 842 (or between the magnetic field sensor signal 812 and a phase-corrected reference signal derived from the reference signal 842). The evaluator 840 is designed to produce information 844, on the basis of the determined phase relation (or phase shift) which indicates that the device according to the invention (or an object or a person which or who is provided with the device 800 according to the invention) has crossed a limit marked by a magnetic field. For example, the evaluator 840 can be designed to detect crossing of a marked limit and to signal by emitting the information 844 if the determined phase relation changes by more than a predetermined change threshold value. For example, the evaluator 840 can be designed to signal crossing of the marked limit by emitting the information 844 if the phase relation changes by more than 90° or by more than 160°.

However, the evaluator 840 can also have additional mechanisms in order to avoid for example a false detection of crossing a marked limit. For example, the evaluator 840 can be designed to suppress signalling which indicates that the marked limit has been crossed if a change in phase relation is caused by a rotation of the device 800. Details in this respect are explained in even more detail subsequently.

The device 800 includes furthermore a reference signal producer 850. The reference signal producer 850 is coupled to the second magnetic field sensor 820 in order to receive from the second magnetic field sensor 820 an associated magnetic field sensor signal 822 which describes for example an x component of the magnetic field strength or of the magnetic flux density. The reference signal producer 850 can be coupled furthermore (optionally) to the third magnetic field sensor 830 in order to receive from the third magnetic field sensor 830 a corresponding magnetic field sensor signal 832 which describes for example a y component of the magnetic field strength or of the magnetic flux density. The reference signal producer 850 is furthermore designed to produce the reference signal 842 and to deliver it to the evaluator 840.

Furthermore, the device 800 optionally includes a rotation detector 860. The rotation detector is designed to receive at least one of the magnetic field sensor signals 812 822, 832 from the magnetic field sensors 810, 820, 830. In one embodiment, the rotation detector 860 is designed to receive at least two of the magnetic field sensor signals 812, 822, 832. In a further embodiment, the rotation detector 860 is designed to receive at least the magnetic field sensor signal 822 from the second magnetic field sensor 820 and the magnetic field sensor signal 832 from the third magnetic field sensor 830. Furthermore, the rotation detector 860 is designed to deliver information 862 relating to a rotation of the device 800 (e.g. relative to an external magnetic field or to an external magnetic alternating field). The rotation detector 860 is coupled for example either to the reference signal producer 850 in order to deliver the information 862 relating to the rotation to the reference signal producer 850 or is coupled to the evaluator 840 in order to deliver the information 862 relating to the rotation to the evaluator 840. Of course, the rotation detector 860 can also be coupled both to the reference signal producer 850 and to the evaluator 840 in order to deliver the information 862 relating to the rotation both to the reference signal producer 850 and to the evaluator 840.

Different aspects of the device 800 which contribute to particularly high reliability of the device 800 are explained subsequently.

In one embodiment, the reference signal producer 850 is designed to receive both the magnetic field sensor signal 822 from the second magnetic field sensor 820 and the magnetic field sensor signal 832 from the third magnetic field sensor 830 and to produce the reference signal as a function of the two magnetic field sensor signals 822, 832. For example, the reference signal producer 850 can be designed to detect which of the two magnetic field sensor signals 822, 832 from the second magnetic field sensor 820 or from the third magnetic field sensor 830 is stronger. Furthermore, the reference signal producer 850 can select for example the stronger of the mentioned magnetic field sensor signals 822, 832 as the reference signal 842.

As an alternative thereto, the reference signal producer 850 can of course produce the reference signal 842 also by a combination of the magnetic field sensor signals 822, 832 from the second magnetic field sensor 820 and the third magnetic field sensor 830. In the case of the corresponding combination, the reference signal producer 850 can weight the magnetic field sensor signals 822, 832 for example according to their strength and/or reliability.

In a further embodiment, the reference signal producer 850 is designed to prevent a phase position of the reference signal changing substantially abruptly (i.e. for example by more than 45°). For example, the reference signal producer 850 can be designed to detect whether the magnetic field sensor signal 822 from the second magnetic field sensor 820 and the magnetic field sensor signal 832 from the third magnetic field sensor 830 have the same or an opposite phase position. If the mentioned magnetic field sensor signals 822, 832 have an opposite phase position, the reference signal producer 850 can implement for example a phase correction such that the phase position of the reference signal 842 does not substantially change when for example a change is made for this purpose to using the magnetic field sensor signal 832 instead of the magnetic field sensor 822 as reference signal 842 or vice versa. Thus the reference signal producer 850 can be designed for example, for that one of the magnetic field sensor signals 822, 832 which is not already selected as reference signal 842, to correct phases such that the phase position of the magnetic field sensor signal not already selected as reference signal is approximated to the phase position of the magnetic field sensor signal selected already as reference signal 842.

As an alternative thereto, the corresponding phase correction can of course also be effected immediately during production of the reference signal 842. In one embodiment, the phase of the reference signal can be changed, for example be inverted, if a change occurs with respect to from which of the magnetic field sensor signals 822, 832 the reference signal is derived and if furthermore a correction of this type is required to avoid a significant change in the phase position of the reference signal (for example by more than 45°).

In summary, the reference signal producer 850 can be designed for example to counteract quite generally a change in phase position of the reference signal 842. Such a measure is of great advantage in particular when the reference signal 842 is produced not only using a single magnetic field sensor signal 822, 832, because a plurality of magnetic field sensor signals 822, 832 can have entirely different phase positions, as is shown for example in FIG. 7.

In a further embodiment, the device 600 includes the rotation detector 860. The rotation detector 860 can be designed to reduce or exclude the influence of rotations of the device 800 on the information 844. The rotation detector 860 is designed for example to detect, by means of the magnetic field sensor signals 812, 822, 832 delivered by the magnetic field sensors 810, 820, 830, if the device 800 rotates in the magnetic field used for marking the limit. The rotation detector 860 can evaluate for this purpose one, two or even three of the magnetic field sensor signals 812, 822, 832.

In a further embodiment, the rotation detector 860 is designed for example to evaluate magnetic field sensor signals 822, 832 from the second magnetic field sensor 820 and the third magnetic field sensor 830. Thus a rotation of the device 800 can be tracked for example by a continuous evaluation of the magnetic field components $H_x$ and $H_y$ in the x direction or y direction.

On the basis of the detection of this rotation of the device 800, the rotation detector 860 can produce for example the information 862. The information 862 can be evaluated for example by the reference signal producer 850 in order correspondingly to correct the reference signal 842 (for example using an optional reference signal corrector 870). The optional reference signal corrector 870 can thereby be designed for example to produce the reference signal 842 such that a phase position of the reference signal is essentially independent of the rotation of the device 800. For example, the reference signal corrector can be designed to produce the reference signal 842 such that a phase position of the reference signal, during a rotation of the device by 360°, changes at most by 90°. The reference signal corrector 870 can obtain this correction in that the reference signal corrector, as a function of the current angle of rotation as is established by the rotation detector 860 and described by the information 862, selects for example a suitable signal from the magnetic field sensor signals 822, 832 and/or performs a phase correction, for example by phase change by 180°.

In a further embodiment, consideration of the information 862 with respect to the rotation of the device 800 is effected in the evaluator 840. For example, the evaluator 840 can suppress signalling which indicates that the device 800 has crossed the marked limit if the information 862 indicates that the device 800 has rotated at least by a predetermined angle, i.e. for example at least by 135° or by approximately 180°. If the evaluator 840 includes a functionality of this type, then high reliability of the device 800 can be achieved in some embodiments even without correction of the reference signal 842.

In summary, various possibilities exist for increasing the reliability of the device 800. On the one hand, a correction can be implemented when producing the reference signal 842, by means of which it is effected that the phase position of the reference signal 842 does not substantially change even during a rotation of the device 800. This can be achieved by simple measures, such as for example by adjusting the phase positions of the magnetic field sensor signals 822, 832. Alternatively or additionally, a rotation of the device 800 can however also be detected by an optional rotation detector 860 and the corresponding information 862 relating to the rotation can be used for correction of the reference signal 842.

Furthermore, it is also possible to supply the information 862 relating to the rotation directly to the evaluator 840, the evaluator being able to detect, upon occurrence of a correspondingly large rotation (for example by at least 90° or by at least) 135°) that a change in phase relation between the magnetic field sensor signal 812 from the first magnetic field sensor 810 and the reference signal 842 is based on a rotation of the device 800 and not on crossing the marked limit. The corresponding information can then be used to prevent crossing of a limit being signalled merely by rotation of the device 800.

Furthermore, reference may be made to the fact that apportioning the different functionalities to the individual components of the device 800 can be changed. For example, the correction of the reference signal in the evaluator 840 can be effected so that for example the evaluator 840 (and not the reference signal producer 850) includes the optional reference signal corrector 870. Furthermore, the rotation detector 860 can be for example part of the reference signal producer 850 or of the evaluator 840.

Furthermore, the device 800 according to FIG. 8 can be extended in a different way. Thus for example the information 844 which indicates that a limit marked by a magnetic field has been crossed can be used to actuate an actuator. For example, the information 844 which can be represented for example by a suitable (electrical or optical) signal can be used to actuate an actuator in order, in response to crossing of a marked limit, to brake or stop an object or a person on which/whom the device 800 is applied. If for example the device 800 is fitted on a shopping trolley or disposed in one embodiment in a wheel component of a shopping trolley, then the information 844 can be used to actuate an actuator for braking or locking a wheel of the shopping trolley. Hence, for example the device 800 can be used to brake or lock the movement of the shopping trolley in response to crossing of the marked limit. Furthermore, the device can be designed in addition such that braking or locking is eliminated again if the marked limit is crossed a second time (preferably in the opposite direction). Thus the following sequence for example is possible: the shopping trolley crosses the marked limit from inside to outside, whereupon crossing of the limit is signalled and whereupon furthermore at least one wheel of a shopping trolley is braked or locked. Subsequently, the shopping trolley is turned around in a region outside the marked limit. This turning around of the shopping trolley in fact leads for example to a change in a phase relation between the magnetic field sensor signal 812 and the magnetic field sensor signal 822 but is not detected, because of the above-described mechanisms, as crossing the marked limit. If the thus turned shopping trolley subsequently again crosses the marked limit, then this actual crossing is in turn detected and leads for example to the locking or braking of the wheel being released. If the shopping trolley is hence situated again in the interior of the region delimited by the marking, then it can be moved again without effort.

In summary, when using the device 100 or 800 according to the invention, for example theft protection for shopping trolleys can be achieved.

FIG. 9 shows a flow chart of a method according to the invention for detecting if an object or a person crosses a limit marked by a magnetic alternating field. The method according to FIG. 9 is designated in its entirety with 900. The method 900 includes in a first step 910 detection of a first magnetic field component of the magnetic alternating field. The method 900 includes furthermore, in a second step 920, detection of a second magnetic field component of the magnetic alternating field.

Furthermore, the method 900 includes, in a third step 930, delivery of information which indicates that the object or the person has crossed the marked limit, in response to a change in phase relation between a signal delivered on the basis of detection of the first magnetic field component and a signal delivered on the basis of detection of the second magnetic field component.

The method 900 according to FIG. 9 can be supplemented by those steps and features which are explained within the scope of the present description.

The method 900 according to FIG. 9 can also be implemented as a computer program.

In other words, the device according to the invention and the method according to the invention can be implemented in hardware or in software. The implementation can be effected on a digital storage medium, for example a diskette, a CD, a DVD, a ROM, a PROM, an EPROM, an EEPROM or a FLASH memory, with electronically readable control signals which can cooperate with a programmable computer system such that the corresponding method is implemented. In general, the present invention hence also resides in a computer program product with a program code, stored on a machine-readable carrier, for implementing the method according to the invention when the computer program product runs on a computer. Expressed in other words, the invention can be produced as a computer program with a program code for implementing the method according to the invention when the computer program runs on a computer.

Furthermore, the devices and methods described here can be used both in conjunction with a magnetic alternating field and in conjunction with a magnetic constant field. During use in conjunction with a magnetic constant field, instead of evaluation of a phase relation, evaluation of a sign relation or direction relation of magnetic field components occurs. In a static case, i.e. using a static magnetic field, crossing of the limit leads in fact not to a change in phase relation or phase shift between two magnetic field components but to a static change in the sign relation or direction relation of the magnetic field components.

The present concept is summarized briefly once again in the following.

FIG. 2 shows, by way of example, an operating principle of a shopping trolley theft system. In other words, FIG. 2 shows an area with a buried cable 250 at the limits. A cable 250 is buried at the limits of the area to be observed (e.g. of the car park or forecourt 210). The cable is connected for example to a generator or transmitter 260 which is installed for example in the interior of a supermarket or of a shop building 210. For example a receiver with a receiver coil is fitted on a shopping trolley 240*a*, 240*b*, 240*c*, 240*d*. The receiver (for example the device 100 according to FIG. 1*a* or the device 800 according to FIG. 8) is connected for example to a braking mechanism (or to another actuator) in order to stop the trolley or shopping trolley when crossing the limit.

FIG. 3 shows a cross-section through the ground 340 and the cable 250 which is buried therein. The cable is thereby represented for example by the conductor 316 which is subjected to a flow of current. FIG. 3 shows furthermore a shopping trolley with a receiver in the wheel which is moved over the cable 250 or over the buried conductor 316 which is subjected to a flow of current. The receiver in the wheel or in a wheel component can concern for example the device 100 according to FIG. 1*a* or the device 800 according to FIG. 8.

The supplied cable 250 or the buried conductor 316 which is subjected to a flow of current produces a magnetic alternating field. However, as described above, also a magnetic constant field can be produced in some embodiments.

In the wheel or wheel component 334 of the shopping trolley 330, for example a receiver coil or z coil $L_z$ is fitted, which is orientated for example perpendicular to the surface or ground surface 318. In FIG. 3, a momentary recording of the magnetic field lines 312*a*-312*e* around the buried conductor 316 which is subjected to a flow of current is represented at the time $t=T_0$. The magnetic field of the cable or of the buried conductor 316 which is subjected to a flow of current induces a voltage $U_z$ in the receiver coil (or in the z coil 358) of the receiver (i.e. for example the device 100 or the device 800). The voltage (e.g. $U_z$) at the coil (for example at the z coil 358) in a receiver of a shopping trolley which is situated at the time $t=T_0$ in the region a above the cable or conductor 316 which is subjected to a flow of current (which is situated therefore for example on the left above the conductor 316 which is subjected to a flow of current or which is situated within the region delimited by the conductor 316 which is subjected to a flow of current) has a different polarity (for example phase difference=180°) from the voltage at the coil (for example the z coil 358) of a shopping trolley which is situated at the same time $t=T_0$ in the region b (is situated therefore for example on the right above the buried conductor 316 which is subjected to a flow of current or outside the region delimited by the conductor 316 which is subjected to a flow of current). This fact results on the basis of the different directions of the magnetic field lines 312a-312e which pass through the coil (e.g. the z coil 358) (e.g. in the various regions a and b). Directly above the line 316, the magnetic field has furthermore no component which passes through the perpendicular coil (e.g. the z coil 358). The induced voltage (e.g. voltage $U_z$) here is therefore equal to zero.

By determination of the polarity of the induced voltage (for example the voltage $U_z$ induced in the z coil 358), a differentiation can hence be made between the two regions "a" within the area and "b" outside the area. Since the magnetic field can concern for example an alternating field, the polarisation (or the polarity of the magnetic field) changes with the carrier frequency of the emitted signal (or with the carrier frequency of the current flow in the conductor 316 which is subjected to a flow of current). The carrier frequency can for example be 8 kHz. It is hence advantageous if, at any time T a reference polarity for the region "a" or for the region "b" is known.

FIG. 4 shows a graphic representation of the polarity of the voltage $U_z$ induced in the z coil 358 as a function of time, by way of illustration.

The above-mentioned reference polarity of the induced voltage can be determined for example by the use of one or two additional receiver coils which are fitted for example not perpendicular but parallel to the surface of the ground 318. These receiver coils (for example the x coil 378) are passed through by the same magnetic field lines, however in the regions "a" and "b" (i.e. to the left of the conductor 316 which is subjected to a flow of current and to the right of the conductor 316 which is subjected to a flow of current) always in the same direction. Therefore the polarity of the induced voltage (in the x coil 378 or a corresponding y coil) changes only with the signal course of the carrier signal and not along the path x (or along the x direction).

On the basis of a change in polarity of the induced voltage at the coil in the z direction (i.e. the voltage $U_z$ induced in the z coil 358) relative to the coil in the x direction (x coil) or y direction (y coil), crossing of the cable or of the conductor 316 which is subjected to a flow of current can therefore be detected. In other words, if the polarity of the voltage $U_z$ changes relative to the polarity of the voltage $U_x$ (or if a phase relation between the voltage $U_z$ and the voltage $U_x$ changes), then this indicates crossing of the limit between the region "a" to the left of the conductor which is subjected to a flow of current and the region "b" to the right of the conductor which is subjected to a flow of current.

Furthermore, it is advantageous, for detecting in which direction the cable or the conductor 316 which is subjected to a flow of current has been crossed, if it is known how large the polarity difference between the x coil and the z coil or the y coil and the z coil in the regions "a" and "b" is or should be. In the case of a coordinate system, as shown for example in FIG. 5, the polarity of the z coil (or of the voltage $U_z$ delivered by the z coil) for example in the region "a" would be in phase relative to the polarity of the x coil (or the voltage $U_x$ delivered by the x coil).

In the case of a system which leaves a region (e.g. a region delimited by the conductor 316 which is subjected to a flow of current) perpendicular to the buried cable or perpendicular to the buried conductor 316 which is subjected to a flow of current, it can be sufficient merely to evaluate the x coil (for example in conjunction with the z coil but without using a y coil). In the case of a system like the shopping trolley theft system described here, the region (e.g. the region delimited by the conductor 316 which is subjected to a flow of current) can however, in some embodiments, be left and entered again at (almost) any angle relative to the cable or to the conductor 316 which is subjected to a flow of current. It can therefore be sensible to evaluate both the x coil and a y coil.

A further difficulty in the case of a shopping trolley 330 resides in the fact that both the wheel or wheel component 334 and the shopping trolley and hence the receiver with the receiver coils (therefore for example the device 100 or the device 800) can be rotated in any way about the z axis (the z axis being able to be for example approximately perpendicular to the surface 318). Hence for example the orientation of the x coil and of the y coil changes relative to the cable or the conductor 316 which is subjected to a flow of current. Hence also a reference for a polarity determination of the z coil (or for a determination of the polarity of the voltage $U_z$) changes.

A rotation of the wheel or wheel component 334 or of the shopping trolley 330 can be detected however by simultaneous evaluation of the x and y coils and can jointly have some influence in determination of the polarity of the z coil (also termed "z coil polarity") as long as the trolley or shopping trolley 330 is situated above the cable or conductor 316 which is subjected to a flow of current (or at least in the vicinity of the cable or the conductor 316 which is subjected to a flow of current.

In one embodiment, a rotation of the wheel component 334 or of the shopping trolley 336 about the z axis cannot be detected furthermore if the wheel component or the shopping trolley is situated outside a region in which a signal can be received from the conductor 316 which is subjected to a flow of current or from the cable. In some embodiments, an absolute position of the wheel or wheel component 334 or even of the trolley or shopping trolley 330 when crossing the cable or the buried conductor 316 is hence not known. Therefore in some embodiments, it is assumed from a priori knowledge for resolving the problem that the trolley is situated initially within the area (i.e. within the region delimited by the conductor 316 which is subjected to a flow of current) and respectively only a change in phase is detected.

In one embodiment, an automatic locking and unlocking system can operate as follows:

a. A movement in the direction of the cable is detected. The detection of a movement can be effected for example in that the signal strength changes at the z coil. Alternatively, the detection of a movement can also be effected in that a state of "no signal at z coil" changes to "signal at z coil".

b. The polarity of the z coil (or of the voltage $U_z$ induced in the z coil) is detected with respect to the x coil (or y coil, according to which signal is stronger).

c. A polarity of the x coil (or of the y coil, according to which coil was chosen under 2.) is detected relative to the y coil (or x coil).

d. If for example the polarity of the x coil (or y coil) changes relative to the reference coil (for example relative to the y coil or relative to the x coil), then the wheel or wheel component has rotated for example by (approx.) 180°. The polarity of the reference signal for the z coil is hence also inverted.

e. If a change in polarity of the z coil (or of the voltage $U_z$ induced in the z coil) relative to the x coil (or y coil) occurs and if no rotation of the wheel or trolley (for example determined according to d.) has taken place, then crossing of the cable or of the conductor which is subjected to a flow of current has taken place. The trolley is situated outside the area. The wheel is locked.

When re-entered (e.g. the region delimited by the conductor 316 which is subjected to a flow of current), the same course for example can take place, starting from a state "trolley outside the area". When crossing the cable or the conductor 316 which is subjected to a flow of current, i.e. for example upon a change in polarity at the z coil, a transition can be made to the state "trolley within the area" and the wheel can be unlocked.

In the above embodiments, it is assumed that the trolley can still be moved even with a locked wheel, however with fairly great effort.

The above-described method can be applied also for other application fields. For example the method can also be used in those fields in which there are no wheels for locking. For example, with the described method, persons, such as for example elderly persons, can be monitored. They can wear a receiver unit with the above-mentioned coils (for example a device 100 according to FIG. 1 or a device 800 according to FIG. 8). The receiver unit is in this case equipped for example not with a locking system but with a transmitter which transmits a message when leaving the area.

Leaving the area can however also be signalled in other ways, e.g. via an acoustic or optical signal transmitter.

The above-described method could also be applied for monitoring security areas, e.g. in the case of machines. In one embodiment, a report is likewise transmitted again without wires to the machine and the machine is stopped if a machine operator with a receiver enters a specific area.

In summary, with the methods described here in some embodiments, an economical automatic system for theft security can be produced, which manages without the installation of a second cable or the use of an additional mobile device. In some embodiments, the system hence becomes more client friendly. Furthermore, in some embodiments, the operation can take place with a sinusoidal signal (e.g. a sinusoidal current signal in the conductor 316 which is subjected to a flow of current), as a result of which for example the transmitter-side technology (and also the receiver-side technology) is simplified. Thus the transmitter-side technology (as also the receiver-side technology) becomes, in some embodiments, more narrow band and hence can be achieved more easily and economically.

Some embodiments of the present invention hence resolve the problem of automatically detecting leaving and re-entering of a region. In some embodiments, this is possible using merely a signal or merely a buried signal cable and using a modulated or unmodulated, symmetrical (sine) carrier signal, as is used in commercially available systems. In some embodiments, the automatic locking and unlocking of a trolley wheel is hence possible.

Some embodiments of the present invention can be used in conjunction with theft monitoring of shopping trolleys in supermarkets.

In some embodiments, the concept can however be used in other fields:
monitoring of persons;
monitoring of storage facilities and workshops; or
monitoring of security areas in machines.

In general, all application fields in which leaving or entering a specific area is intended to be monitored automatically are conceivable.

The device described herein for detecting if an object or a person crosses a limit marked by a magnetic field can be used in many further applications. For example, it is possible to use the device for detecting if an object or a person crosses a limit marked by a magnetic field in order to detect line crossings in ball games (such as for example, in soccer). Details in this respect are explained in the following.

The device described here or the method described herein can serve for example in a simplest case for detecting line crossings in ball games (e.g. soccer). For example, the concept described here can be used to detect if a player, who is equipped for example with a device for detecting if a person crosses a limit marked by a magnetic field, crosses a playing field delimitation or even any line within the playing field. The playing field delimitation or quite generally any line within the playing field, around the playing field or outside the playing field can be marked for example by a magnetic field (e.g. a magnetic constant field or a magnetic alternating field). For example, the playing field can be surrounded by a cable in the ground. Hence the method or concept described here can also be used to detect line crossings.

A participant in a game or a ball can carry for example a receiver with receiver coils (or other magnetic field sensors). The receiver can be equipped in addition with a radio transmitter in order to transmit a detection to a central place.

In other words, if the receiver coupled to or provided with magnetic field sensors (e.g. receiver coils) detects crossing of a line which hence represents for example a limit marked by a magnetic alternating field, then for example the radio transmitter, which is part of the receiver or which can be connected to the receiver, can emit a corresponding signal. In response to receiving this signal or signalling signal, the crossing of the line or of the limit marked by the magnetic field can be detected.

Reference may be made here to the fact that the corresponding concept can be used in almost any types of sport, in soccer, in handball, in volleyball, in tennis, in ice hockey etc. Furthermore, any devices involved in the game (e.g. a ball, a puck, a racket or an item of equipment carried by the player) can be provided with the receiver or the receiver coils.

Furthermore, reference may be made to the fact that almost any regions of the playing field can be characterized by a magnetic field as a limit. It is of course thereby not necessary that the limit is also actually characterized by a visible line. Rather, for example a magnetic marking of partial regions of a playing field or of a playing area can also be effected without a concrete significance being assigned to the respective partial region or to the respective line due to the rules of the game. Such a fine sub-division of a playing field or a playing area can be desirable for example for producing specific statistics with respect to the course of the game.

According to a further embodiment, the concept described here can also be used to reach a goal decision, e.g. in a soccer game (or in a handball game or in an ice hockey game or in any other game in which playing equipment is to be introduced through a delimited opening). In the following, such a concept is described by way of example with reference to a soccer game. The above embodiments can however be transferred to a handball game, an ice hockey game or even to a basketball game (in this case the basket being able to be regarded as goal).

FIG. 10a shows a schematic representation of a playing area according to an embodiment of the invention. The playing field according to FIG. 10a is designated in its entirety with 1000. The playing field 1000 includes a goal 1010, which delimits a goal area at least partially. The goal 1010 includes for example a left goal post 1012, a right goal post 1014 and also a goal bar or crossbar 1016. Furthermore, the goal is disposed, as generally known, on the ground 1020. The goal 1010 can be disposed for example on a grass surface, on a clay court, on a hall floor of any type or on a different type of base. The goal 1010, which comprises the left goalpost 1012, the right goalpost 1014 and the crossbar 1016, delimits a goal area 1030 together with the base 1020. In different types of sports, a goal event is allowed if playing equipment (e.g. a ball, a soccer ball, a handball or a puck) penetrates through the goal area 1030 from a region in front of the goal (1010) into a region behind the goal 1010 or in the interior of the goal.

The goal 1010 can furthermore comprise in addition, in a region behind the goal area 1030, a grating, a net or other mechanisms which can be designed for example to prevent the playing equipment leaving the region behind the goal area at the rear.

The playing area 1000 includes furthermore a first electrical conductor 1040 which is disposed along a first delimitation of the goal area 1030.

The first electrical conductor 1040 can be disposed for example along a goal line which delimits the goal area 1030. The first electrical conductor 1040 can be laid for example on the ground 1040 or else be buried or recessed at a specific depth in the ground 1020.

The playing area 1000 includes furthermore a second electrical conductor 1050 which is disposed for example along a second delimitation of the goal area 1030 which is situated opposite the first delimitation of the goal area 1030. For example, the second electrical conductor 1050 can be disposed along the goal bar or crossbar 1016. The second electrical conductor 1050 can be disposed for example below the crossbar 1016, above the crossbar 1016 or even within the crossbar 1016.

Hence, for example the goal area 1030 is situated at least approximately between the first electrical conductor 1040 and the second electrical conductor 1050.

In this respect, it must be stressed that the expression "along" should not be understood in a strict sense but includes a specific tolerance range. For example in some ball games (e.g. soccer), the rule is that a ball is judged to be "in the goal" only if the ball has completely crossed the goal line. Hence in some embodiments, the first electrical conductor 1040 and/or the second electrical conductor 1050 can be disposed for example up to approx. half a ball diameter or a whole ball diameter (e.g. of a ball which is intended for a game towards the goal) behind the goal line (i.e. for example in a region of a goal interior or below the goal interior). Such an arrangement is regarded here also as "along the goal line" or "along the crossbar". The mentioned definition similarly applies if conductor loops are used instead of the conductors 1040, 1050.

The playing area 1000 includes furthermore an excitation mechanism 1060 which is designed to excite a current flow in the first electrical conductor 1040 and to excite a current flow in the second electrical conductor 1050. For this purpose, the excitation mechanism 1060 can be effectively coupled electrically both to the first electrical conductor 1040 and to the second electrical conductor 1050. The excitation mechanism 1060 can be designed for example to feed a direct current or alternating current into the first conductor 1040. Furthermore, the excitation mechanism 1060 can be designed to supply a direct current or alternating current into the second conductor 1050.

In one embodiment, the excitation mechanism 1060 can be designed for example to supply an alternating current of a first frequency into the first conductor 1040 and to supply an alternating current of a second frequency into the second conductor 1050. In a further embodiment, the excitation mechanism 1060 can be designed to supply the first conductor 1040 and the second conductor 1050 with a current in a temporally offset manner.

By means of the above-described playing area, it is made possible for example to be able to detect with comparatively high reliability whether playing equipment (e.g. a soccer ball) penetrates the goal area 1030. By means of the mentioned conductors 1040, 1050, a magnetic field can be produced such that, for example by means of a magnetic field sensor situated in the playing equipment, it can be detected whether the playing equipment has penetrated for example through the goal area 1030 into the goal or in the region behind the goal or whether the playing equipment has flown for example over the crossbar 1016 of the goal 1010. Furthermore, particularly good coverage of the goal area 1030 can be achieved by the described arrangement. Thus for example in a lower region of the goal area 1030, the magnetic field produced by the first electrical conductor 1040 is stronger than the magnetic field produced by the upper conductor 1050. In a lower region of the goal area 1030, i.e. in the vicinity of the first electrical conductor 1040, a magnetic field sensor in the playing equipment can hence evaluate primarily or exclusively the magnetic field produced by the first electrical conductor 1040 (or the corresponding magnetic field component). In contrast however in the upper region of the goal area 1030, the magnetic field produced by the second conductor 1050 is stronger than the magnetic field produced by the first electrical conductor 1040. A magnetic field sensor in the playing equipment can hence evaluate in the upper region of a goal area 1030 primarily or exclusively the magnetic field produced by the second electrical conductor 1050 (or the corresponding component of a total magnetic field). Hence in one embodiment, no substantial regions in which only a very weak magnetic field is present exist in the entire goal area. Rather, as a result of the fact that electrical conductors are disposed on opposite delimitations of the goal area 1030, comparatively good homogeneity of the magnetic field is achieved.

Furthermore, the use of two electrical conductors 1040, 1050, in some embodiments, enables separate actuation of the mentioned electrical conductors 1040, 1050. Hence in one embodiment, a magnetic field sensor in playing equipment can evaluate both the magnetic field produced by the first electrical conductor 1040 and the magnetic field produced by the second electrical conductor 1050. This makes it possible to obtain particularly comprehensive information with respect to the magnetic fields. For example in one embodiment, a phase shift between the magnetic field produced by the first electrical conductor 1040 and the second electrical conductor 1050 can be evaluated in order to conclude hence about whether the playing equipment has passed through the goal area 1030 or not.

In summary, it can be stressed that an arrangement of two electrical conductors 1040, 1050 along oppositely situated delimitations of the goal area 1030 enables particularly good detection of a goal event (i.e. penetration of playing equipment through the goal area 1030).

Figure 10B:
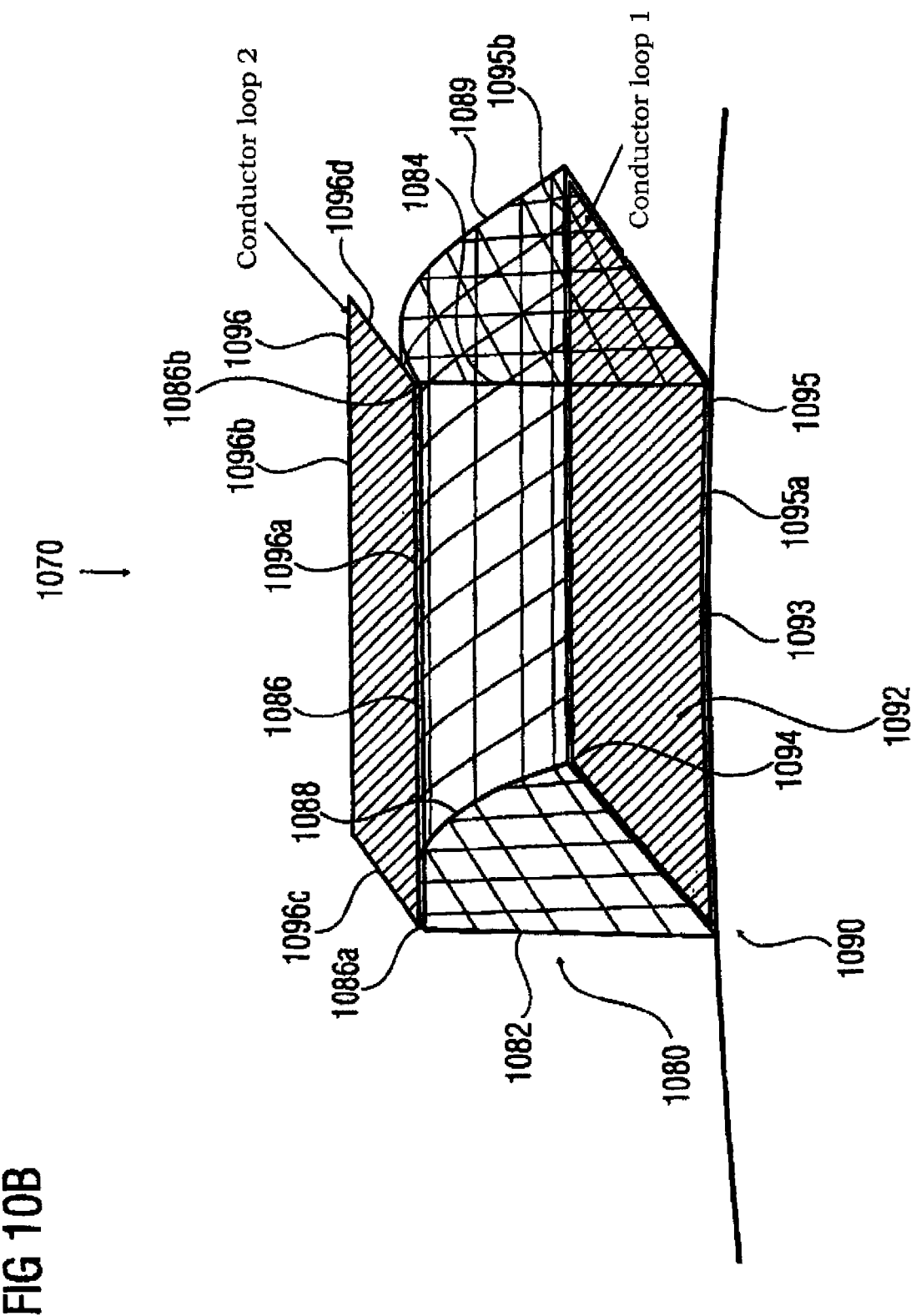
FIG. 10b is a schematic representation of a playing area according to an embodiment of the invention.

FIG. 10*b* shows a schematic representation of a playing area according to the embodiment of the invention.

The playing area according to FIG. 10*b* is designated in its entirety with 1070. The playing area 1070 includes a goal 1080. The goal 1080 includes for example a left post 1082, a right post 1084 and a goal bar or crossbar 1086. The goal 1080 includes furthermore for example a left side part 1088 and a right side part 1089. The left side part 1088 is connected for example to the left post 1082 in order to form a left support structure of the goal. Similarly, the right side part 1089 is connected for example to the right goal post 1084 mechanically in order to form a right support structure of the goal. Furthermore, the goal includes a net. For example, the net can be fixed to the left goal post 1082 and to the right goal post 1084 and also to the crossbar 1086, as is known for example of soccer goals. The left side part 1088 and the right side part 1089 can be designed for example to guide the net such that a goal interior is produced which is delimited, on the one hand, by the open goal area and, on the other hand, by the net. The goal 1080 is normally on the ground 1090 (e.g. a piece of grass, a hall floor or other base). Hence an inner goal base area 1092 is defined by the goal 1080 in conjunction with the ground 1090. The inner goal base area 1092 is delimited for example with respect to a playing field by a goal line 1093 (for example a section from the goal line). To the side and towards the rear, the inner goal base area 1092 is delimited for example via a first line which extends from a base point of the left goal post 1082 up to a left rear net fixing point 1094, by a second line which extends from the left rear net fixing point 1094 up to a right rear net fixing point 1095 and by a third line which extends from the right rear net fixing point to a base point of the right goal post 1084. At the left rear net fixing point, for example the net is fixed to the ground 1090 or to a fixing mechanism fitted on the ground 1090. Likewise the net is fixed to the right rear net fixing point on the ground 1090 or to a fixing mechanism.

Quite generally, it can be emphasised that the goal base area, on the one hand, is delimited by the goal line 1093 and, on the other hand, by lines along which the net is fixed to a fixing mechanism or to the ground 1090.

In one embodiment, the playing area 1070 according to FIG. 10*b* includes a conductor loop which is laid along a periphery of the inner goal base area 1092. The conductor loop 1095 (also termed first conductor loop or conductor loop 1) can be laid for example along the periphery of the inner goal base area 1092 above ground or below ground. For example the first conductor loop 1095 can be buried along the periphery of the inner goal base area in the ground 1090.

The playing area 1070 includes furthermore, in one embodiment, a second conductor loop 1096 which is disposed for example above the goal base area 1092. In one embodiment, the second conductor loop 1096 is disposed for example approximately parallel to the first conductor loop 1095 and approximately at the height of the crossbar 1086. For example, the second conductor loop 1096 can be disposed such that the second conductor loop 1096 encloses an angle of at most 30° with the ground or with the inner goal base area 1092. In one embodiment, the second conductor loop 1096 has an approximately rectangular form. In one embodiment, one side of the second conductor loop 1096 is disposed along the crossbar 1086. In other words, in the mentioned embodiment, one side of the conductor loop is disposed for example on the upper side of the crossbar 1086, on the underside of the crossbar 1086 or possibly even within the crossbar 1086. The corresponding side of the conductor loop 1096 which is disposed on or in the crossbar 1086 is designated with 1096*a*.

In one embodiment, the upper conductor loop 1096 includes a second side 1096*b* which is situated opposite the first side 1096*a* of the conductor loop 1096. The second side 1096*b* of the conductor loop 1096*a* can be for example at least approximately parallel to the first side 1096*a* of the conductor loop 1096. The conductor loop 1096 includes furthermore for example a third side 1096*c* and a fourth side 1096*d*. The third side 1096*c* and the fourth side 1096*d* can be disposed for example above the left side part 1088 or above the right side part 1089. In other words, the left side 1096*c* and the right side 1096*d* of the conductor loop 1096 can be disposed for example above a left or a right delimitation of the inner goal base area 1092. The third side 1096*c* of the second conductor loop 1096 can however also be fitted on the left goal support 1088. The right side 1096*d* of the second conductor loop 1096 can be fitted furthermore on the right goal support 1089.

In some embodiments, the second conductor loop 1096 can however also be configured entirely differently. For example it is not necessary that the second conductor loop 1096 has a rectangular shape. Rather, it is sufficient in some embodiments if the first side 1096*a* of the second conductor loop 1096 extends along the crossbar 1086. In this case, for example the second conductor loop 1096*a* can be closed by a conductor arrangement which is shaped in almost any way and extends at least approximately from a first end 1086*a* of the crossbar 1086 to a second end 1086*b* of the crossbar 1086. It is thereby merely of importance that the corresponding conductor arrangement which closes the second conductor loop 1096 always extends behind the goal line 1093, i.e. on the side of the goal line on which the inner goal base area 1092 is situated.

In some embodiments, the second conductor loop 1096 for example can be disposed such that a perpendicular projection of the second conductor loop 1096 towards the ground 1090 (the projection direction being perpendicular to the surface of the ground 1090) always lies along the goal line or on the side of the goal line on which the inner goal base area 1092 is also situated.

In a further embodiment, the second conductor loop 1096 is disposed such that a perpendicular projection of the second conductor loop 1096 towards the ground 1090 lies in the interior or at the edges of the inner goal base area 1092.

In one embodiment, the second conductor loop 1096 lies furthermore above a goal interior which is delimited by the inner goal base area 1092 and the net of the goal.

The playing area 1070 includes furthermore an excitation mechanism which is not shown here and is designed to excite the first conductor loop 1095 and the second conductor loop 1096. The excitation unit can be designed for example to excite a direct current or alternating current in the first conductor loop 1095 and to excite a direct current or an alternating current in the second conductor loop 1096.

Figure 11:
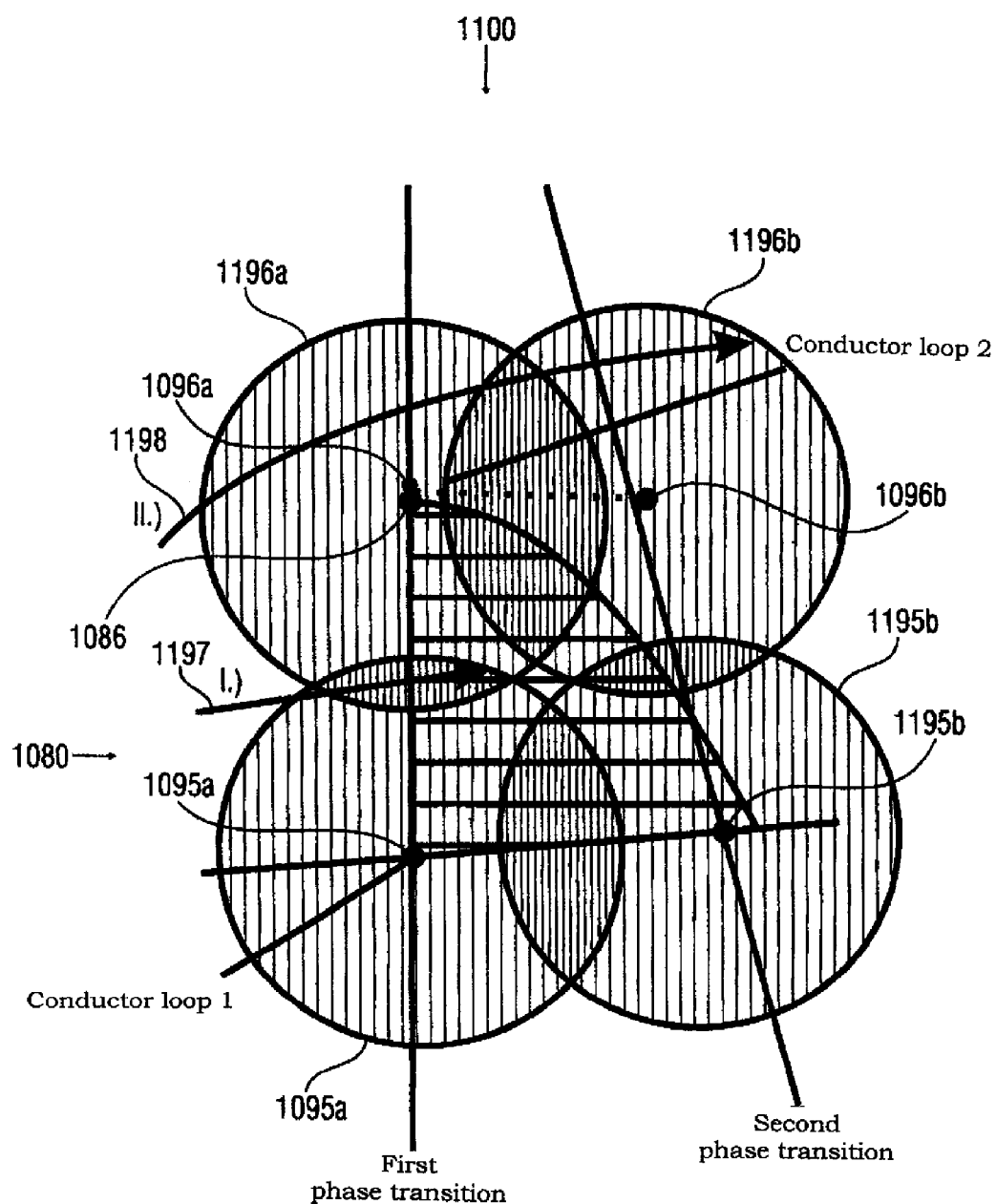
FIG. 11 is a cross-sectional representation of a goal and also of the magnetic fields present in the region of the goal.

FIG. 11 shows a cross-sectional representation of a playing area according to FIG. 10*b*. The playing area according to FIG. 11 is designated in its entirety with 1100. Furthermore, reference may be made to the fact that identical mechanisms in FIGS. 10*b* and 11 are provided with the same reference numbers and therefore are not explained again in detail.

The cross-sectional representation according to FIG. 11 shows a goal 1080. The cross-sectional representation shows for example the crossbar 1086 in which or on which the first side 1096*a* of the second conductor loop 1096 is disposed. In the illustrated example, the first side 1096*a* of the second conductor loop 1096 is disposed for example above the crossbar 1086. In another embodiment, the first side 1096*a* of the second conductor loop 1096 can however also be disposed in the crossbar 1086 or below the crossbar 1086. The cross-sectional representation of FIG. 11 shows furthermore the second side 1096*b* of the second conductor loop 1096. The second side of the conductor loop 1096*b* can be disposed for example at the same height as the first side 1096*a* of the second conductor loop 1096. As an alternative thereto, it is however also possible that the second side 1096*b* of the second conductor loop 1096 is disposed slightly below the first side 1096*a*. For example, the second side 1096*b* of the second conductor loop 1096 can be fitted on a fixing mechanism via which the net of the goal 1080 is also mounted.

The cross-sectional representation of FIG. 11 shows furthermore a first side 1095*a* of the first conductor loop 1095 and also a second side 1095b of the first conductor loop 1095. The first side 1095a of the first conductor loop 1095 can be disposed for example along the goal line (for example buried below the goal line 1093). The second side 1095b of the first conductor loop is disposed furthermore for example along a rear delimitation of the inner goal base area 1092.

The cross-sectional representation of FIG. 11 shows furthermore a schematic representation of the magnetic field, how it is produced for example by the first side 1095a and the second side 1095b of the first conductor loop 1095 and also by the first side 1096a and the second side 1096b of the second conductor loop 1096.

A magnetic field produced by the first side 1095a of the first conductor loop 1095 is illustrated schematically by a circle 1195a and a magnetic field, as is produced for example by the second side 1095 of the first conductor loop 1095, is represented schematically by a corresponding circle 1195b. A magnetic field, as is produced for example by the first side 1096a of the second conductor loop 1096, is represented schematically by a corresponding circle 1196a and a magnetic field, which is produced for example by the second side 1096b of the second conductor loop 1096, is represented schematically by a circle 1196b.

FIG. 11 shows furthermore a first trajectory 1197 of playing equipment (e.g. a soccer ball) into the goal. The first trajectory 1197 extends between the first side 1095a of the first conductor loop 1095 and the first side 1096a of the second conductor loop 1096.

The cross-sectional representation of FIG. 11 shows furthermore a second trajectory 1198 of playing equipment (e.g. a soccer ball) which extends over the goal. The second trajectory 1198 hence extends above the first side 1096a of the second conductor loop 1096 and likewise above the second side 1096b of the second conductor loop 1096.

Hence, for example the first trajectory 1197 of the playing equipment can lead to a valid goal event, while the second trajectory 1198, in contrast, does not lead to a valid goal event.

In the following, a device, by way of example, for delivering information with respect to a goal event is described with reference to FIG. 12. The device according to FIG. 2 is designated in its entirety with 1200. In this respect, reference may be made to the fact that the device 1200 has in part functionalities which are very similar to the functionalities of the device 800 according to FIG. 8. For this reason, reference is made here also to the description of the functionality of the device 800.

The device 1200 includes for example a first receiver coil 1210, a second receiver coil 1220 and a third receiver coil 1230. The three receiver coils 1210, 1222 and 1230 correspond for example, with respect to their mode of operation, to the receiver coils 810, 820, 830 and can be replaced just like the receiver coils 810, 820, 830 by other mechanisms for detecting a magnetic field. The device 1200 includes furthermore an acceleration sensor 1232 which is designed to detect acceleration of the device 1200. The acceleration sensor 1232 can be designed for example to detect, in addition to additional external accelerations, also a gravitational acceleration. The acceleration sensor 1232 can be designed for example to detect a direction of a force acting on the device 1200 (including gravity). In some embodiments, the acceleration sensor 1232 can for example deliver qualitative and/or quantitative information relating to the value of the acceleration. In one embodiment, the acceleration sensor 1232 concerns furthermore an acceleration sensor which can detect the acceleration in at least two different directions or even in three different directions. The device 1200 includes furthermore a direction detector 1234, which can be coupled for example to the acceleration sensor 1232 in order to obtain information relating to a direction of an applied acceleration. The direction detector 1234 can hence be designed for example to deliver information 1236 which can describe for example an orientation of the receiver coils 1210, 1202, 1230 with respect to a direction of an acceleration acting on the device 1200. The device 1200 includes furthermore a coordinate system transformer 1238 which is designed for example to receive the transmitted signals of the first receiver coil 1210, of the second receiver coil 1220 and of the third receiver coil 1230.

The coordinate system transformer 1238 is furthermore designed, on the basis of the direction information 1236 delivered by the detection director 1234 and furthermore on the basis of the sensor signals 1211, 1221, 1231 delivered by the receiver coils 1210, 1220, 1230, to deliver direction-corrected or direction-transformed information relating to three components 1239a, 1239b, 1239c of the magnetic field.

For example, the coordinate system transformer 1238 can be designed to obtain information relating to a magnetic field component in the direction of gravitational acceleration. If for example it is known on the basis of the direction information 1236 in which direction (relative to an orientation of the device 1200) an acceleration (e.g. a gravitational acceleration) acting on the device 1200 acts, then for example the coordinate system transformer 1238 can determine, on the basis of knowledge relating to the orientation of the receiver coil (1210, 1220, 1230), how large a component of the magnetic field is in the z direction, for example in the direction of gravitational acceleration. Hence, for example the z component 1239a describes at least approximately a component of the magnetic field in a direction parallel to the acceleration acting on the device 1200 (for example approximately to the magnetic field component in the direction of gravitational acceleration). The x component 1239b and the y component 1239c describe for example magnetic field components in directions perpendicular to the direction of the acceleration acting on the device (e.g. gravitational acceleration). Reference may be made in this respect to the fact that, in some embodiments, the device 1200 is not able to determine an absolute angle position of the device 1200 with respect to a rotation about a z axis (i.e. about an axis in the direction of gravitational acceleration). In this respect, various possibilities exist of imaging the three magnetic field components detected by the receiver coils 1210, 1220, 1230 onto the x component 1239b and the y component 1231c. In some embodiments, a degree of freedom of the coordinate system transformer exists therein exclusively. In other words, the coordinate system transformer in some embodiments can be designed to derive the x component 1239b and/or the y component 1239c, according to an at least partly arbitrarily chosen coordinate system transformation, from the signals 1211, 1221, 1231 of the receiver coils 1210, 1220, 1230.

The device 1200 includes furthermore an evaluator 1240 which, from its mode of operation, corresponds for example to the evaluator 840. The device 1200 includes furthermore a reference signal producer 1250 which can correspond, in its mode of operation, essentially to the reference signal producer 850. The reference signal producer 1250 is designed furthermore to deliver a reference signal 1242 to the evaluator 1240.

The device 1200 can include furthermore optionally a rotation detector 1260 which is designed for example to receive the signals 1211, 1221, 1231 from the receiver coils 1210, 1220, 1230 and to detect a rotation. The rotation detector 1260 can furthermore alternatively cooperate also with the coordinate system transformer. In one embodiment, the rotation detector 1260 can receive, for example instead of the signals (or in addition to the signals) of the receiver coils 1210, 1220, 1230, the component signals 1239a, 1239b and 1239c (or a selection of these signals). The rotation detector 1260 can furthermore be coupled optionally to the reference signal producer 1250 and/or to the evaluator 1240 in order to deliver information 1262 relating to a rotation to the reference signal producer 1250 and/or to the evaluator 1240.

The evaluator 1240 is designed for example to deliver information 1244 which indicates that the device 1200 has crossed a limit marked by a magnetic field (for example a magnetic constant field or a magnetic alternating field). By using the coordinate transformation or by using the coordinate system transformer 1238, for example the information 1244 can be obtained such that this indicates if the device 1200 has crossed a limit or boundary area extending vertically above (i.e. above in the direction of gravitational acceleration) a conductor which is subjected to a flow of current, or if the device 1200 has crossed a limit or boundary area extending vertically below (i.e. below in the direction of the first acceleration) a conductor which is subjected to a flow of current.

In other words, the information 1244 can be obtained for example such that the information 1244 indicates if the device 1200 has crossed an area which is described or marked by a conductor which is subjected to a flow of current and which extends in the direction of gravitational acceleration. For example, the device 1200 can be designed such that the information 1244 indicates how the device passes through the goal area, i.e. the area which is delimited by the goal line 1093, the left post 1082, the right post 1084 and the crossbar 1086. The information 1244 can furthermore indicate in addition if the device 1200 moves for example over the crossbar. In this case also, the information 1244 can be active.

Quite generally, the information 1244 can hence indicate if the device 1200 crosses a boundary area which is marked for example by the magnetic field of a conductor which is subjected to a flow of current.

In some embodiments, it is thereby unimportant how the information 1244 precisely is produced. In other words, the mechanisms 1210, 1220, 1230, 1234, 1238, 1240, 1250, 1260 can be replaced by another suitable arrangement which delivers corresponding information 1244.

The device 1200 includes furthermore a goal detector 1280 which is designed, on the basis of the information 1244 and (optionally) on the basis of information delivered by the acceleration sensor 1232, to detect a goal event and hence to deliver information 1282 relating to a goal event. In one embodiment, the goal detector 1280 is designed to detect a goal event if the information 1244 indicates that the device 1200 crosses a marked limit (e.g. by the magnetic field of a conductor which is subjected to a flow of current), unless information is present which indicates that crossing of the limit marked by the magnetic field cannot be attributed to a goal event. In one embodiment, the goal detector 1280 is configured to produce corresponding information which indicates that crossing of the marked limit cannot be attributed to a goal event if the device 1200, within a prescribed time, crosses a limit marked by a magnetic field twice without great external acceleration (in addition to the gravitational acceleration) having acted on the device or on the acceleration sensor 1232. In order to determine whether a great acceleration has acted on the device 1200 or on the acceleration sensor 1232 associated with the device 1200, the acceleration signal for example delivered by the acceleration sensor 1232 can be supplied to the goal detector 1280 for evaluation. The goal detector 1280 hence can be configured for example to determine whether, between a first time at which the device 1200 crossed a limit marked by the magnetic field for a first time and a second time at which the device 1200 crossed a limit marked by a magnetic field for a second time, an acceleration was detected by the acceleration sensor 1232 which is at least equal to a prescribed minimum acceleration. If such a "high" acceleration occurs, then the goal detector 1280 can emit for example the information 1282 relating to a goal event, even if, within a prescribed time, a limit marked by a magnetic field has been crossed more than once. If such a "high" acceleration does not occur, then the goal detector 1280 can be configured, in contrast, to suppress emission of information 1282 relating to a goal event as long as the device 1200 has crossed one or more different limits marked by a magnetic field at least twice within the prescribed time.

Figure 13:
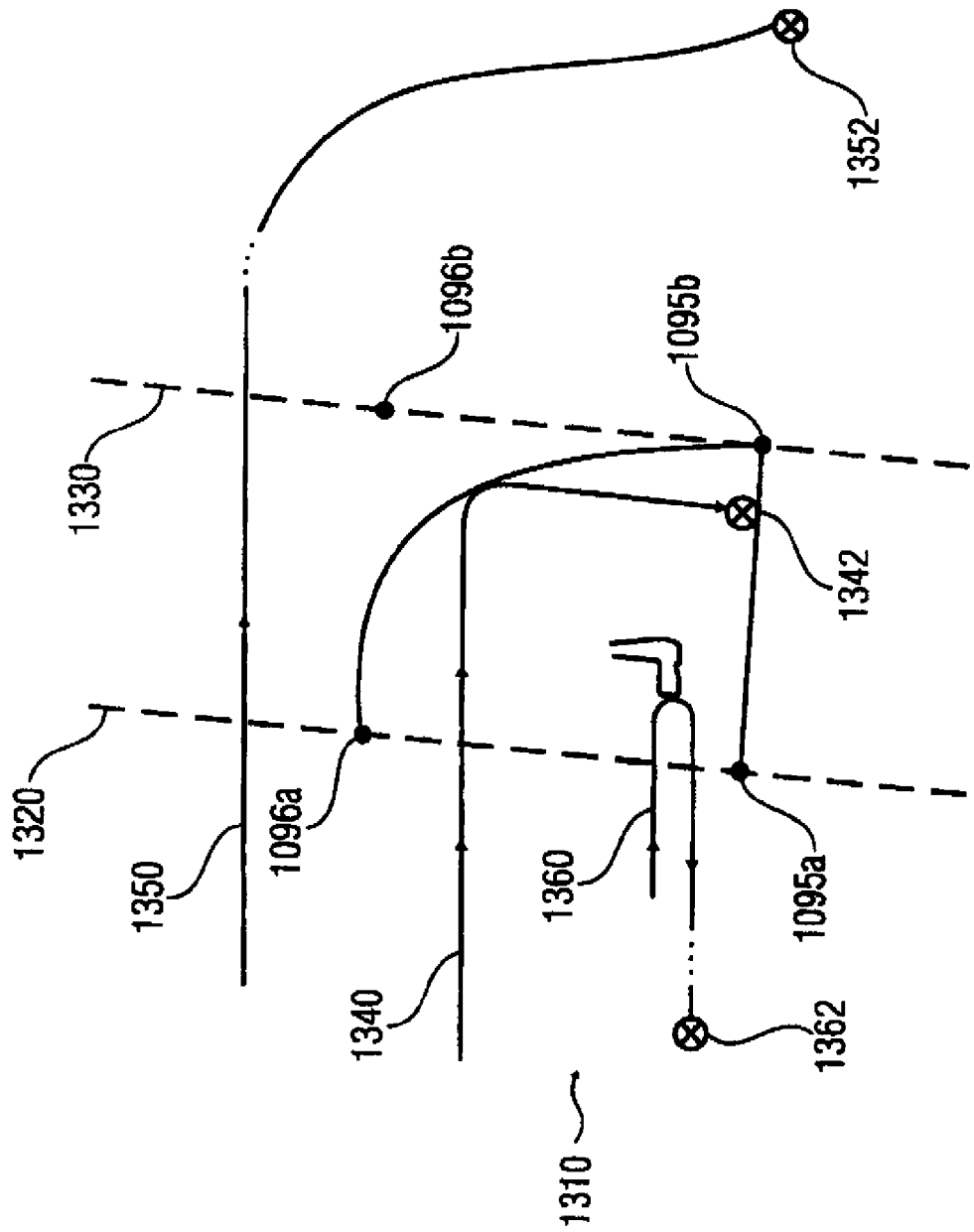
FIG. 13 is a schematic representation of various possibilities in detection of a goal event.

The mode of operation of the mentioned mechanism is explained subsequently with reference to FIG. 13. FIG. 13 shows a cross-section through a playing area according to an embodiment of the invention. The playing area according to FIG. 13 essentially includes the same elements as the playing area according to FIG. 11. However, representation of the magnetic fields has been dispensed with here for reasons of clarity. The same mechanisms are described in FIGS. 11 and 13 however with the same reference numbers and are not described again.

FIG. 13 shows a goal 1310. On the goal or adjacent to the goal, two conductor parts 1095a, 1095b in the first conductor loop 1095 and also two conductor parts 1096a, 1096b on the second conductor loop 1096 are disposed. By means of the magnetic field produced in the conductor parts 1095a, 1096a, a limit 1320 marked by a magnetic field is produced and is indicated in FIG. 13 in broken lines. By means of the magnetic field produced in the conductor parts 1095b and 1096b, furthermore a limit 1330 marked by a magnetic field is produced. While in the present embodiments it is assumed for simplification that the first limit 1320 is produced essentially by the conductor parts 1095a, 1096a, in reality also the magnetic field components produced by the conductor parts 1095b, 1096b of course have an influence on the course of the first limit 1320. Similarly, magnetic field components produced by the conductor parts 1096a, 1095a also have an influence on the course of the second limit 1330. For reasons of simplicity, the mentioned interactions are however essentially ignored.

Three cases are described subsequently. In a first case, it is assumed that playing equipment, e.g. a ball, is shot into the goal, is braked by the goal net and remains lying within the goal. A corresponding trajectory of the ball is designated with 1340 and an end position of the ball is designated with 1342. In this case, the playing equipment crosses the first limit 1320 precisely once. Further crossings of any magnetically marked limits do not however result (or only when a player moves the ball after a relatively long period of time out of the inside of the goal). Hence such a movement course of playing equipment, in which the latter crosses the first limit 1320 once, represents in general a valid goal event.

In a second case, the playing equipment flies over the goal. A corresponding trajectory of playing equipment is designated for example with 1350. After the playing equipment has flown over the goal, the playing equipment falls at some time once on the ground. A final position of the playing equipment is thereby designated with 1352. During its trajectory 1352, the playing equipment crosses the first limit 1320 and the second limit 1330 within a specific period of time which depends upon the speed of the playing equipment. Furthermore, in the case where the playing equipment assumes the trajectory 1350, no goal event occurs at least in some games (e.g. in a soccer game or in a handball game).

In a third case, playing equipment does in fact enter the inside of the goal 1310 but is then hit out of the goal again for example by a player or a goalkeeper. A corresponding trajectory of the playing equipment is designated with 1360 and a final position of the playing equipment, outside the goal, is designated with 1362. The playing equipment hence crosses the first limit 1220 twice in quick succession, namely once when entering the inside of the goal and once when leaving the inside of the goal.

Figure 12:
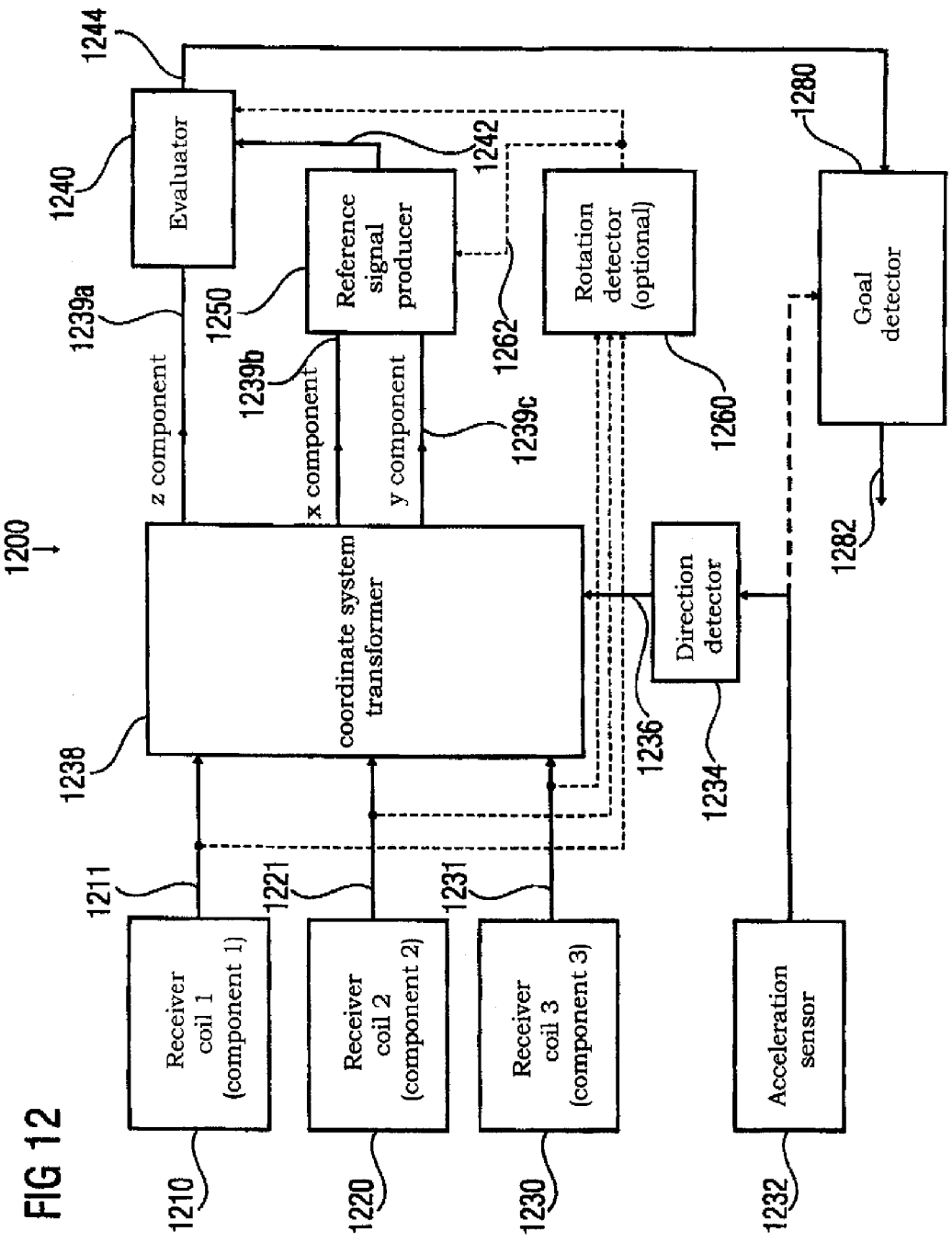
FIG. 12 is a block diagram of a device for detecting a goal event, according to an embodiment of the invention.

If it is now assumed that the device 1200 according to FIG. 12 is disposed for example inside the corresponding playing equipment (e.g. inside a soccer ball, a handball, a puck or other playing equipment), a correct goal decision respectively can be met in the above-described three cases.

If the playing equipment and hence the device 1200 fitted in the playing equipment or on the playing equipment has the first trajectory 1340, then the first limit 1320 has been crossed once. Therefore within a predetermined time interval, a limit marked by a magnetic field, namely the first limit 1320, has been crossed only once. Hence a goal event can be concluded and the goal detector 1280 can emit corresponding information 1282.

If the playing equipment and hence the device fitted in the playing equipment or on the playing equipment is moved along the trajectory 1350, then the device 1200, within a predetermined time interval, twice crosses a limit marked by a magnetic field, namely firstly the first limit 1320 and thereafter the second limit 1330. Furthermore, between crossing the first limit 1320 and crossing the second limit 1330, no substantial acceleration occurs (apart from gravitational acceleration and braking caused by air resistance) upon the playing equipment or the device 1200. Hence, as described above, production of information which indicates a goal event can be suppressed by the goal detector 1280. Hence signalling of a goal event is suppressed in an accurate manner.

If the playing equipment or the device 1200 moves along the path 1360, then the device 1200, within a predetermined time interval, twice crosses a limit marked by a magnetic field, namely the first limit 1320 twice. Furthermore, between the first crossing of the first limit 1320 and the second crossing of the first limit 1320, a substantial acceleration upon the playing equipment or upon the device 1200 occurs since in fact the playing equipment is hit again out of the goal (e.g. by a body part 1364 of a player or goalkeeper). Hence the corresponding acceleration which is generally significantly greater than gravitational acceleration, can be detected. Hence the goal detector 1280 can deliver information 1282 which indicates a goal event in an accurate manner.

In summary, it can hence be stressed that goal events can be reliably detected by the device 1200 in very many cases. Passing over the goal, in contrast, is not recognized by the device 1200 as a goal event.

In some embodiments, the device 1200 can hence advantageously cooperate with a playing area as was portrayed with reference to FIGS. 10*a*, 10*b*, 11 and 13*b*.

A few aspects of the present invention can be therefore summarized as follows:

The method described here (e.g. the method for detecting if an object or a person crosses a limit marked by a magnetic field) can be used for example for detecting line crossings in ball games (e.g. in soccer). In a corresponding manner, the devices described herein can be used for detecting line crossings in ball games.

The method or the device could therefore be used also for detecting line crossings. The playing field can be surrounded for example by a cable in the ground. A participant in the game or a ball can carry for example a receiver with a receiver coil which is equipped for example in addition with a radio transmitter in order to transmit a detection (e.g. a line crossing) to a central point.

According to a further aspect, the devices and methods described herein can be used for example for a goal decision (e.g. in a soccer game).

The method or the device can therefore be used also for a goal decision. For this purpose, for example an area in the goal, for example an area between the two goalposts and e.g. corner points of a mounted net, as shown in FIG. 10*b*, can be surrounded by a buried conductor loop. An object, in this case for example a ball, can be equipped with three orthogonal receiver coils. If for example the ball crosses the line at which the conductor loop is buried, then a phase change for example can be detected. This phase change can then be interpreted for example as a goal or goal event.

In one embodiment, three sides of the goal can be spanned by a net. In this case, a line crossing is effected for example merely over a front goal line. Hence for example entry into a delimited area is detected (e.g. entry of playing equipment or a ball into the inner goal base area or into the interior of the goal).

In some embodiments, it is desirable to resolve entry (e.g. of playing equipment into a goal) also in height, i.e. in a third dimension. Thus it is desirable for example in some embodiments that the entry (e.g. the entry of the ball into the interior of the goal) above a specific height above ground is also detected reliably. On the other hand, it is desirable in some embodiments to differentiate a shot over the goal from a real goal. In some embodiments, a further cable is therefore used above the goal. The cable or the further cable can be fitted for example along a crossbar (of the goal). The further cable can span for example an area between the two posts (or goalposts) and two further corner points behind the goal, e.g. mounting points of the net. In the embodiment, two cables which produce an electromagnetic field are hence present.

In some embodiments, the signals (for example the electrical currents excited in the cables or electrical conductors) are emitted at different frequencies or at different times, i.e. temporally alternating.

With the second conductor loop on the crossbar (e.g. with the second conductor loop 1096), a shot over the goal for example (as is shown for example in FIG. 11 as trajectory 1198) can be detected in that the ball enters an area surrounded by the conductor loop and then however emerges again at the back (for example enters through a first marked limit into a spatial region marked by the second conductor loop and leaves the spatial region marked by the second conductor loop 1096 subsequently again through a second marked limit). In one embodiment, respectively a phase transition is therefore detected upon entry (e.g. into the marked spatial region) and during exit (e.g. out of the marked edge region) in the mentioned case.

In the line laid in the ground or buried in the ground, the net prevents the ball from exiting out of the area surrounded by the conductor loop (e.g. the first conductor loop 1095) (or from exit from a spatial region marked by the first conductor loop 1095).

Furthermore, in some embodiments, a detection region at a height can be improved by the second cable on the crossbar. Since the signal of a cable in many cases reduces with distance, signal reception can be improved for example by using a second cable at a spacing from the first cable.

An additional problem which can occur with a soccer ball compared to a shopping trolley resides in the fact that the ball can move or rotate during flight in all three spatial directions. In some embodiments, it is hence desirable to detect reliably that a phase change or a phase jump does not result from a rotation of the ball but from crossing a cable (or a limit marked by a magnetic field). For this purpose, for example a field strength of the three coil signals can be evaluated. During a rotation, a signal shift between two orthogonal coils for example can result. While the signal strength in one coil increases, it can reduce to the same degree for example in the other coil. Hence, for example such a signal shift in which a signal delivered by one of the receiver coils reduces and in which at the same time a signal delivered by another of the receiver coils increases can be recognized as a rotation. This is different for example when crossing a cable (or when crossing a limit marked by a magnetic field). Here, a field strength reduces in one coil (or in one of the receiver coils) without a field strength in another coil (or in another of the receiver coils) increasing. Precisely above the cable (i.e. for example vertically above the cable or electrical conductor), for example the field strength (or a component of the magnetic field strength) is zero and increases again thereafter with an inverted phase.

Hence, for example crossing a marked limit can be detected by means of such a signal course.

In summary, with reference to FIG. 10b, a goal with two conductor loops was described, said goal being suitable for example for detecting goal events with high reliability. A first conductor loop (e.g. the first conductor loop 1095) can be buried thereby in the ground and a second conductor loop (e.g. the second conductor loop 1096) can be fitted at least partially on the crossbar 1086.

FIG. 11 shows a goal with a conductor loop from the side. A trajectory 1197 describes a shot into the goal and a trajectory 1198 describes a shot over the goal. The mentioned shots into the goal or over the goal can be differentiated in some embodiments of the device according to the invention or of the method according to the invention.

A few embodiments which should be understood as optional possibilities for complementing the concept described herein are described subsequently by way of example.

According to one embodiment, the present invention produces a playing area having a goal, the goal delimiting a goal area at least partially, a first electrical conductor which is disposed along a first delimitation of the goal area, a second electrical conductor which is disposed along a second delimitation of the goal area which is situated opposite the first delimitation of the goal area and an excitation mechanism which is designed to excite a current flow in the first electrical conductor and to excite a current flow in the second electrical conductor.

According to a further aspect, the invention produces a playing area, the goal delimiting three sides of an essentially rectangular goal area, a goal line delimiting a fourth side of the essentially rectangular goal area (1030), the first electrical conductor (1040; 1095a) being disposed along at least a part of the goal line and the second electrical conductor (1050; 1096a) being disposed along a crossbar (1016; 1086) of the goal.

According to a further aspect, the invention produces a playing area in which the second electrical conductor is part of a conductor loop which is disposed above a goal interior in order to span a loop area which encloses an angle of no more than 30° with a base area (1092) on which the goal is disposed.

According to a further aspect, the invention produces a playing area, the second conductor (1050; 1096a) being part of a conductor loop, the conductor loop being disposed such that playing equipment which flies in a horizontal direction in a straight line over the crossbar beyond the goal is situated twice vertically above a conductor portion associated with the conductor loop.

According to a further aspect, the invention produces a playing area, the excitation mechanism being designed to excite the first electrical conductor such that the first electrical conductor is subjected to a flow of an alternating current of a first frequency and in order to excite the second electrical conductor such that the second electrical conductor is subjected to a flow of an alternating current of a second frequency, the first frequency differing from the second frequency.

According to a further aspect, the invention produces a playing area in which the excitation mechanism is designed to excite the first electrical conductor and the second electrical conductor such that the first electrical conductor and the second electrical conductor are subjected to a flow of an electrical current in a temporally alternating manner.

According to one aspect, the present invention produces a method for delivering information with respect to a goal event. The method includes detection of whether playing equipment crosses a first limit marked by a magnetic alternating field or whether the playing equipment crosses a second limit marked by a magnetic alternating field, the first limit being marked by a conductor which is subjected to a flow of current along a goal line of a goal and the second limit being marked by a conductor which is subjected to a flow of current along a crossbar of the goal. The method includes signalling that a goal event occurs, in response to detection that the playing equipment has crossed the first limit or the second limit, unless information is present which indicates that the playing equipment crosses a third limit marked by a magnetic field after crossing the second limit, the third limit being marked by a conductor which is subjected to a flow of current and is disposed such that the third limit is crossed by playing equipment which moves beyond the goal above the crossbar.

According to one aspect, establishing whether the playing equipment crosses the third limit within a prescribed period of time after crossing the second limit includes the following steps:
  detection of whether the playing equipment has crossed two marked limits within the prescribed period of time; and
  if the playing equipment has crossed two marked limits within the prescribed period of time,
    detection of whether an acceleration has acted on the playing equipment between crossing the two limits, which acceleration is greater than or equal to a prescribed maximum acceleration, and
    providing information which indicates that the playing equipment has crossed the third limit if no acceleration has acted on the playing equipment between crossing the two limits, which acceleration is greater than or equal to the maximum acceleration.

According to one aspect, the device described herein and the method described herein are complemented for example by all those aspects which were described with respect to detection of a goal event.

One embodiment of the present invention was described previously with reference to FIGS. 2 to 7. In some productions of this embodiment, the signal which is emitted by the typically buried line or conductor loop and which can be for example a simple 8 kHz alternating field, is received via three parallel oscillating circuits tuned to a somewhat higher frequency, the coils of which circuits are disposed orthogonally relative to each other. The signals received by the coils are amplified and supplied to comparators which can be integrated in a microcontroller.

In order to be able to evaluate the signals in the microcontroller, the trigger is a rising or falling edge of the z signal, i.e. of the signal received by the coil orientated in the z direction. The z signal is independent of the wheel position. By means of a thereby obtained trigger signal, the following sampling program is initiated: output values of the comparators for the z direction, the x direction and the y direction are sampled in the form of 1/0 information which reproduces an actual polarity and are written into a corresponding record in succession in this sequence. Eight sampling values (corresponding to one byte) are listed and processed thereby per period of the alternating field.

The triggering is effected with the help of the z signal since this can be received in each locked position as long as the wheel is simply not located precisely above a phase jump position. For the same reason, the z signal is likewise used for a field detection implemented by an external comparator. By means of a correspondingly long low phase which lasts longer than the 16 milliseconds required for the sampling of the eight kHz signal, the microcontroller detects leaving of the field or a return to the same. As a result, an initial state can be produced. Above all however noise problems with a non-present signal are consequently avoided, which is of great importance for the power management.

In the evaluation, the sampled values are compared with each other bit-wise, from which the phase relations of the signals z-x, z-y and x-y are derived. If the sampling values of for example z and x are the same (1 or 0), then the signals are in phase. If the two signals are not the same, they are in antiphase. Therefore, only the phase information per period and not the value of the respective signal is considered. From the relative phase states between x, y and z (the letters x, y and z stand here respectively for the signal which is received from the coil orientated in the corresponding direction), states can be derived, as represented for example in FIG. 7. On the left, the states there on one side of the line are represented, on the right the states on the other side of the line. When crossing the line, specific state transitions occur which are produced from the differences between the field strengths standing respectively adjacently in FIG. 7 (corresponding to signal strengths). If a state change which marks a limit or line crossing is established, the microcontroller causes application or release of the brake in the case of the shopping trolley.

It is possible that, at an access secured in the described manner, not only a single line but a rectangular conductor loop, for example, is provided in which the two conductor portions extending in parallel can have a comparatively small spacing from each other, for example a spacing of approx. 1 m. Then superimposition of field lines can result which are caused by the different conductor portions so that, when passing the access, not only are two phase changes measurable which would be assigned to the two conductor portions but in total five phase changes. There are thereby designated as phase change a jump of a relative phase between two signals measured with two differently orientated coils. The circumstance just portrayed can be taken into account with a corresponding evaluation algorithm.

In the proposed method, signal changes which are attributed to crossing the limit marked by the line can be differentiated precisely in the case of the shopping trolley which is rotated generally only about the z axis significantly from those signal changes which can be attributed to a rotation of the shopping trolley. In this case, a rotation of the trolley can be detected easily by an evaluation of a relative phase and/or intensity of the signals assigned to the directions x and y (see FIG. 7).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The invention claimed is:

1. A device for detecting whether an object or person crosses a limit marked by a magnetic alternating field, the device comprising:
 a first magnetic field sensor that detects a first magnetic field component of the magnetic alternating field and delivers an associated magnetic field sensor signal;
 a second magnetic field sensor that detects a second magnetic field component of the magnetic alternating field; and
 an evaluator configured to deliver information that indicates that the object or person has crossed the marked limit in response to a change in a phase relation between the magnetic field sensor signal and a reference signal based on the detected second magnetic field component, wherein the evaluator prevents provision of the information that indicates that the object or the person has crossed the marked limit if a change in the phase relation between the magnetic field sensor signal and the reference signal is effected on the basis of a rotation of the device.

2. The device of claim 1, wherein the first magnetic field sensor and the second magnetic field sensor are disposed such that a magnetic field main sensitivity direction of the first magnetic field sensor encloses an acute angle in a range between 45° and 90° with a magnetic field main sensitivity direction of the second magnetic field sensor.

3. The device of claim 1, wherein the first magnetic field sensor and the second magnetic field sensor are disposed such that a magnetic field main sensitivity direction of the first magnetic field sensor encloses an acute angle in a range between 75° and 90° with a magnetic field main sensitivity direction of the second magnetic field sensor.

4. The device of claim 1, wherein the device detects rotation of the device relative to the magnetic alternating field, and the evaluator takes into account the detected rotation during delivery of the information which indicates that the object or the person has crossed the marked limit.

5. The device of claim 1, and further comprising:
 a reference signal corrector that, based on the reference signal and information relating to rotation of the device relative to the magnetic alternating field, produces a phase-corrected reference signal in which the influence of rotations of the device relative to the magnetic alternating field upon a phase position is at least reduced in comparison to the reference signal, wherein the evaluator evaluates a phase relation between the magnetic field sensor signal and the phase-corrected reference signal to provide the information that indicates that the object or person has crossed the marked limit.

6. The device of claim 1, and further comprising:
a movement detector that detects rotation of the device relative to the magnetic alternating field on the basis of information relating to at least one of the magnetic field components.

7. The device of claim 6, and further comprising:
a third magnetic field sensor that detects a third magnetic field component of the magnetic alternating field, a magnetic field main sensitivity direction of the third magnetic field sensor differing from magnetic field main sensitivity directions of the first magnetic field sensor and second magnetic field sensors, wherein the rotation detector detects the rotation of the device relative to the magnetic alternating field on the basis of a magnetic field sensor signal delivered by the second magnetic field sensor and on the basis of a magnetic field sensor signal delivered by the third magnetic field sensor.

8. The device of claim 7, wherein the magnetic field main sensitivity direction of the first magnetic field sensor enclosing an acute angle in a range between 70° and 90° with a plane which is spanned by the magnetic field main sensitivity directions of the second magnetic field sensor and of the third magnetic field sensor.

9. The device of claim 7, wherein the rotation detector detects a rotation of the device relative to the magnetic alternating field if a phase relation between a magnetic field sensor signal delivered by the second magnetic field sensor and a magnetic field sensor signal delivered by the third magnetic field sensor changes relative to an initial phase relation by more than a prescribed phase relation change threshold.

10. The device of claim 1, wherein the evaluator delivers the information that indicates that the object or the person has crossed the marked limit in response to a change in polarity of the magnetic field sensor signal delivered by the first magnetic field sensor relative to the reference signal.

11. The device of claim 1, and further comprising:
a reference signal producer that determines the reference signal as a function of at least two magnetic field sensor signals from at least two magnetic field sensors.

12. The device of claim 11, and further comprising:
a third magnetic field sensor that detects a third magnetic field component of the magnetic alternating field, a magnetic field main sensitivity direction of the third magnetic field sensor differing from magnetic field main sensitivity directions of the first and second magnetic field sensors, wherein the reference signal producer determines the reference signal as a function of a magnetic field sensor signal of the second magnetic field sensor and a magnetic field sensor signal of the third magnetic field sensor.

13. The device of claim 12, wherein the reference signal producer (a) determines which of the magnetic field sensor signals delivered by the second magnetic field sensor and by the third magnetic field sensor is stronger, and (b) derives the reference signal from the stronger of the magnetic field sensor signals delivered by the second magnetic field sensor and by the third magnetic field sensor.

14. The device of claim 13, wherein the reference signal producer effects a phase correction with respect to the reference signal such that an effective phase position of the reference signal remains unchanged if a change occurs with respect to the magnetic field sensor signals from which the reference signal is derived.

15. The device of claim 1, and further comprising:
an actuator that brakes or locks a movement of the object in response to information delivered by the evaluator that indicates that the object or the person has crossed the marked limit.

16. The device of claim 15, wherein the actuator further releases braking or locking of the object in response to information delivered by the evaluator which indicates that the object or the person has crossed the marked limit if the movement of the object was previously braked or locked.

17. The device of claim 1, and further comprising:
a signal transmitter that emits a warning signal in response to information delivered by the evaluator which indicates that the object or the person has crossed the marked limit.

18. A method for detecting if playing equipment crosses a limit marked by a magnetic alternating field, the method comprising:
detecting a first magnetic field component of the magnetic alternating field;
delivering a signal based on the detection of the first magnetic field component;
detecting a second magnetic field component of the magnetic alternating field; and
delivering information that indicates that the playing equipment has crossed the marked limit in response to a change in a phase relation between the signal delivered on the basis of detection of the first magnetic field component, and a signal based on the detection of the second magnetic field component,
the method further comprising:
detecting whether the playing equipment crosses a first limit marked by a magnetic field or whether the playing equipment crosses a second limit marked by a magnetic field, the first limit being marked by a first conductor part which is subjected to a flow of current along a goal line of a goal, and the second limit being marked by a second conductor part which is subjected to a flow of current along a crossbar of the goal, and
signaling that a goal event occurs, in response to detection that the playing equipment has crossed the first limit or the second limit, unless information is present which indicates that the playing equipment crosses a third limit marked by a magnetic field after crossing the second limit, the third limit being marked by a third conductor part which is subjected to a flow of current and is disposed such that the third limit is crossed by playing equipment which moves beyond the goal above the crossbar.

19. The method of claim 18, wherein establishing whether the playing equipment crosses the third limit within a prescribed period of time after crossing the second limit is determined by:
detecting whether the playing equipment has crossed two marked limits within the prescribed period of time; and
if the playing equipment has crossed two marked limits within the prescribed period of time:
detecting whether an acceleration has acted on the playing equipment between crossing the two limits and whether the acceleration is greater than or equal to a prescribed maximum acceleration, and
providing information that indicates that the playing equipment has crossed the third limit if no acceleration greater than or equal to the prescribed maximum acceleration has acted on the playing equipment between crossing the two limits.

20. A system for detecting if an object or person crosses a limit marked by a magnetic alternating field, the system comprising:
- an alternating field source which is designed to produce a magnetic alternating field along a limit to be marked; and
- a device comprising:
  - a first magnetic field sensor that detects a first magnetic field component of the magnetic alternating field and delivers an associated magnetic field sensor signal;
  - a second magnetic field sensor that detects a second magnetic field component of the magnetic alternating field; and
  - an evaluator configured to deliver information that indicates that the object or person has crossed the marked limit in response to a change in a phase relation between the magnetic field sensor signal and a reference signal based on the detected second magnetic field component, wherein the evaluator prevents provision of information that indicates that the object or the person has crossed the marked limit if a change in the phase relation between the magnetic field sensor signal and the reference signal is effected on the basis of a rotation of the device.

* * * * *